United States Patent [19]

Prokai et al.

[11] 3,954,824

[45] May 4, 1976

[54] ORGANOSILICONE POLYMERS AND POLYESTER URETHANE FOAM PRODUCED THEREWITH

[75] Inventors: Bela Prokai, Mahopac; Bernard Kanner, West Nyack, both of N.Y.

[73] Assignee: Union Carbide Corporation, New York, N.Y.

[22] Filed: Apr. 3, 1974

[21] Appl. No.: 457,510

[52] U.S. Cl. .......... 260/448.8 R; 260/448.2 N; 260/2.5 AH; 252/182; 260/46.5 R; 260/46.5 E; 260/46.5 Y
[51] Int. Cl.² .................. C07F 7/08; C07F 7/10; C07F 7/18
[58] Field of Search .......... 260/448.2 N, 448.8 R, 260/46.5 R, 46.5 E, 46.5 Y

[56] References Cited
UNITED STATES PATENTS

| | | | |
|---|---|---|---|
| 2,872,435 | 2/1959 | Speier | 260/46.5 Y |
| 3,026,278 | 3/1962 | Walton et al. | 260/448.2 N X |
| 3,185,663 | 5/1965 | Prober | 260/46.5 E |

*Primary Examiner*—Paul F. Shaver
*Attorney, Agent, or Firm*—Marylin Klosty

[57] ABSTRACT

Organosilicone polymers are provided containing monofunctional units $(R)_3SiO_{1/2}$ and reoccurring difunctional units $(R)(Q)SiO_{2/2}$ and $(R)(E)SiO_{2/2}$, as essentially the sole types of units or in combination with reoccurring difunctional dialkylsiloxy units, $R_2SiO_{2/2}$, where R of said units is alkyl, Q is —O—R°—CN or —R°—CN, R° being bivalent alkylene, and E is a polyoxyalkylene block, at least 75 weight percent of the oxyalkylene content of the polymers being constituted of oxyethylene and the mole ratio of the $(R)_3SiO_{1/2}$:$(R)_2SiO_{2/2}$: $(R)(Q)SiO_{2/2}$:$(R)(E)SiO_{2/2}$ units being about 2:0–20:2–20:2–30, provided the combined weight of said units is constituted, on the average, of from about 50 to about 85 weight percent of said polyoxyalkylene blocks (E). The polymers of the invention are effective stabilizers of flexible polyester polyol-based polyurethane foams and offer particular advantage in the formation of flame-retarded foams. Also described is a particular class of cyano-substituted polyalkylsiloxane hydrides which are useful in the preparation of the aforesaid polymers.

36 Claims, No Drawings

3,954,824

ORGANOSILICONE POLYMERS AND POLYESTER URETHANE FOAM PRODUCED THEREWITH

BACKGROUND OF THE INVENTION

The present invention relates to novel organosilicone polymers, and their use in the manufacture of urethane cellular products, particularly flexible polyester urethane foams including flame-retarded foams.

It is well known that the urethane linkages of urethane foams are formed by the exothermic reaction of a polyfunctional isocyanate and a polyfunctional active hydrogen-containing compound in the presence of a catalyst, and that the cellular structure of the foam is provided by gas evolution and expansion during the urethane-forming reaction. In accordance with the "one-shot process" which is the most widely used industrial technique, direct reaction is effected between all of the raw materials which include the polyisocyanate, the active hydrogen-containing compound, the catalyst system, blowing agent and surfactant. A major function of the surfactant is to stabilize the urethane foam, that is, prevent collapse of the foam until the foamed product has developed sufficient gel strength to become self-supporting.

It is also well known that suitable active hydrogen-containing compounds include polyether polyols and polyester polyols. From the standpoint of their chemical structure, therefore, urethanes are usually classified as polyether and polyester urethanes, respectively. Urethane foams also differ with respect to their physical structure and, from this standpoint, are generally classified as flexible, semi-flexible or rigid foams.

Although certain techniques of urethane manufacture such as the one-shot process and certain components of the foam formulation such as the polyisocyanates, amine catalyst and blowing agent, are generally useful, a specific problem associated with the production of a particular type of urethane foam and the solution thereto are often peculiar to the particular chemical and physical structure of the desired foamed product. Thus, a significant development in the production of a polyether foam or a rigid foam, for example, may not be generally applicable to the production of other cellular products. In particular, the efficacy of the foam stabilizer is usually selective with respect to the formation of a particular type of foam. For example, although flexible polyester foam was originally made using conventional organic surfactants or emulsifiers, such compounds were not effective for the manufacture of flexible polyether foam. As urethane technology advanced and end-uses became more varied, it became apparent that certain deficiencies in the quality of flexible polyester foam such as the presence of splits and a non-uniform cell structure were attributable, at least in part, to the organic surfactants employed. However, the mere substitution of the organic surfactants with various polysiloxane-polyoxyalkylene block copolymers which had been used as foam stabilizers with satisfactory results in the production of other types of urethane foams (e.g., in the production of polyether urethane foams and certain rigid polyester urethane foams), did not produce completely satisfactory flexible polyester foams.

The search for improved surfactants for stabilization of polyurethane foams is further complicated by the tendency of such foams to ignite readily and burn and the need to reduce their flammability. This characteristic is particularly objectionable in the case of flexible polyurethane foams in view of the use of such foams in many applications where fire is especially hazardous such as, in regard to flexible polyester foam, their use as textile interliners. One approach to reducing flammability of flexible foams is to include a flame-retarding agent such as various phosphorus and/or halogen-containing compounds as a component of the foam-producing reaction mixture. It is found, however, that surfactants which may otherwise be effective stabilizers of non-flame-retarded as well as flame-retarded foams, may not possess the further desirable property of allowing for formation of flame-retarded foam of relatively low burning extent.

For example, a significant development in polyester foam manufacture was the discovery that a satisfactory combination of uniform cell structure and freedom from splits was achieved by using a particular combination of foam stabilizing ingredients. This latter combination comprises (a) an anionic organic surfactant that is soluble in the polyester polyol reactant at room temperature and that is capable of lowering the surface tension of the polyester resin reactant when dissolved therein and (b) a polysiloxane-polyoxyalkylene block copolymer surfactant characterized by a particular molecular weight (from 600 to 17,000), siloxane content (from 14 to 40 weight per cent based on the weight of the copolymer) and oxyethylene content (at least 75 weight per cent based on the total amount of oxyalkylene groups in the copolymer). This particular advance in polyester foam manufacture is described in greater detail in U.S. Pat. No. 3,594,334, granted July 20, 1971. From the standpoint of potency and quality of foam product, an especially effective foam stabilizer of the class described in the latter patent is that referred to herein as comparative Surfactant AA in which silicon of the siloxane portion of the block copolymer component is substituted with methyl groups only. It is found that Surfactant AA is also capable of stabilizing flame-retarded polyester urethane foam. However, flammability properties of the foam product are deficient and appear to indicate an adverse effect of the surfactant on flame-retardant efficiency.

It is desirable, therefore, and is a primary object of this invention, to provide an improved class of polysiloxanepolyoxyalkylene block copolymers which, in addition to good potency as stabilizers of flexible polyester-based urethane foam, both non-flame-retarded and flame-retarded, have the further advantageous property of allowing for the formation of flame-retarded foams of relatively low burning extent.

A further object is to provide flexible polyester urethane foam of substantially reduced flammability and a method for the manufacture of such foam.

Various other objects and advantages of this invention will become apparent to those skilled in the art from the accompanying description and disclosure.

SUMMARY OF THE INVENTION

In accordance with one aspect of the present invention, a novel class of cyano-substituted organosiloxanepolyoxyalkylene polymers are provided containing chemically combined monofunctional siloxy units, M, and reoccurring difunctional siloxy units, Y and Z, where M is trialkylsiloxy, Y is cyanoalkyl-alkylsiloxy or cyanoalkoxy-alkylsiloxy, and Z is an alkylsiloxy unit in which silicon is further bonded to a polyoxyalkylene block (E), the polyoxyalkylene content of the polymers being constituted of at least 75 weight percent polyoxyethylene. The M, Y and Z units can be present in the polymers as essentially the sole types of units or they can be in further combination with reoccurring difunctional siloxy units, X, where X is dialkylsiloxy. The cyano-substituted organosiloxane-polyoxyalkylene polymers of the invention have the average composition:

$$[M]_2[X]_x[Y]_y[Z]_z \qquad (I)$$

wherein the subscripts $x$, $y$ and $z$ designate the average number of moles of the respective difunctional units contained in the polymer for every 2 moles of M, as shown. In the polymers of this invention, $x$ can be zero or any positive number having an average value up to about 20, $y$ has an average value from about 2 to about 20 and $z$ has an average value from about 2 to about 30, provided the average weight of the polymers attributable to said polyoxyalkylene blocks (E) is from about 50 to about 85 weight percent. The M, X, Y and Z units have the following formulae:

M is $(R)_3SiO_{1/2}$

X is $(R)_2SiO_{2/2}$

Y is 
$$R-\underset{\underset{R^\circ CN}{\underset{|}{(O)_q}}}{\overset{|}{Si}}O_{2/2}$$

Z is 
$$R-\underset{\underset{E}{|}}{\overset{|}{Si}}O_{2/2}$$

wherein: R is alkyl; $q$ is zero or 1; R° is bivalent alkylene; and E is the aforementioned polyoxyalkylene block.

In accordance with another aspect of the present invention, there is provided a process for producing flexible polyurethane foam which comprises reacting and foaming a reaction mixture of: (a) a polyester polyol reactant containing an average of at least two hydroxyl groups per molecule; (b) a polyisocyanate reactant containing at least two isocyanato groups per molecule; (c) a blowing agent; (d) a catalyst comprising a tertiary-amine; and (e) a foam stabilizer comprising the aforesaid cyano-substituted organosiloxane-polyoxyalkylene polymers. In addition to their efficacy as stabilizers of polyester-based urethane foams, it has been found that the organosilicone polymers of this invention possess the further advantageous property of allowing for the formation of flame-retarded foams of acceptable overall quality. In accordance with this aspect of the present invention, flame-retarded flexible polyester-based urethane foams are provided by reacting and foaming reaction mixtures which also include a silicon-free, flame-retarding agent.

In providing either the non flame-retarded or flame-retarded foams of the invention, the cyano-substituted organosiloxane-polyoxyalkylene polymers of the invention can be introduced to the foam-producing reaction mixtures either as such, as a blend with various organic additives including organic surfactants, or in combination with one or more of the polyester polyol reactant, blowing agent, amine catalyst or flame-retarding agent.

The present invention also relates to various methods for the preparation of the novel foam stabilizers described herein including the reaction of: (1) polyoxyalkylene reactants which at one end are either hydroxyl-terminated or end-blocked by an olefinically unsaturated group with (2) cyano-substituted polyalkylsiloxane hydrides having the average composition, $$[M]_2[X]_x[Y]_y[Z^\circ]_z \qquad (II)$$

wherein the individual structures of the M, X and Y units are as above-defined, Z° is the difunctional hydroalkylsiloxy unit, $$R-\underset{\underset{H}{|}}{\overset{|}{Si}}O_{2/2},$$

and $x$, $y$ and $z$ are as previously defined.

DETAILED DESCRIPTION OF THE INVENTION AND PREFERRED EMBODIMENTS

The functionality of the respective types of structural units (M, X, Y and Z) of the polymers of this invention denotes the number of oxygen atoms to which the silicon atom (Si) of any particular unit is bonded. Since each oxygen atom is shared by a silicon atom (Si') of another unit, functionality also denotes the number of linkages by which the particular unit can be bonded to another portion of the polymer through —Si—O—Si'— bonds. Accordingly, in expressing the individual formulas of the respective units of the polymers of this invention, fractional subscripts are used in which the value of the numerator defines functionality (i.e., the number of oxygen atoms associated with the silicon atom of the particular unit), and the denominator, which in each instance is 2, denotes that each oxygen atom is shared with another silicon atom. In view of their monofunctionality, the M units are chain terminating or end-blocking units and the respective oxygen atoms thereof are shared with silicon of one other unit which can be Y or Z and, when present, X. On the other hand, X, Y and Z are difunctional and thus the respective two oxygen atoms associated with each silicon atom thereof are shared with respective silicon atoms of other units. Thus, the reoccurring difunctional units may be distributed in the polymer randomly, alternately, as sub-blocks of repeating units of the same type or in any combination of such arrangements. Further, the polymers of the invention comprise mixtures of polymer species which differ in molecular weight, total polyoxyalkylene and siloxane contents, and in the type, arrangement and relative proportions of units. Therefore, as expressed herein the parameters employed to denote these variables are average values and correspond to the relative proportions of reactants from which the various units are derived. It is to be further understood that, consistent with convention in the art to which the present invention pertains, as expressed herein, the formulas of the polymers indicate their overall average empirical composition rather than any particular ordered arrangement of units or molecular weight of any particular polymer species. With this understanding, the average composition of the polymers of the invention may be expressed by the following formula wherein the various siloxy units are shown in chemically combined form:

$$R_3SiO[R_2SiO]_x[\underset{\underset{R^\circ CN}{|}}{\overset{|}{R}SiO}]_y[\underset{\underset{E}{|}}{\overset{|}{R}SiO}]_zSiR_3 \qquad (III)$$

wherein: R, R°, E, q, x, y and z are as above defined.

The silicon-bonded R groups are alkyls having from 1 to 10 carbon atoms including linear and branched alkyls. Illustrative of suitable groups encompassed by R are: methyl, ethyl, n-propyl, isopropyl, n-butyl, t-butyl, pentyl, hexyl, octyl and decyl. Of the various groups represented by R, the lower alkyls (that is, those having from 1 to 4 carbon atoms) are preferred of which methyl is especially suitable. It is to be understood that the R groups may be the same throughout the polymer or they may differ as between or within units without departing from the scope of this invention.

In the silicon-bonded, cyano-substituted —R°CN and —OR°CN groups, R° represents a bivalent alkylene radical including linear and branched radicals of the series, —$C_cH_{2c}$—, where $c$ has a value of from 2 to 12, and is usually no more than 6. Illustrative of suitable groups represented by R° are: ethylene (—$CH_2CH_2$—); trimethylene (—$CH_2CH_2CH_2$—); propylene [—$CH_2CH(CH_3)$—]; and tetramethylene. Most preferably, —R°— is a lower alkylene group having from 2 to 4 carbon atoms. It is to be understood that the —R°— groups may be the same throughout the polymer or they may differ and that the polymer may contain any combination of cyanoalkyl- (NC—R°—) and cyanoalkoxy- (NC—R°O—) substituted alkylsiloxy units. For example, the Y units may be one or more of the following: (beta-cyanoethoxy) methylsiloxy; (beta-cyanoethyl) methylsiloxy; (beta-cyanopropyl) methylsiloxy; (gamma-cyanopropyl) methylsiloxy; (gamma-cyanopropoxy) methylsiloxy; (gamma-cyanopropyl) ethylsiloxy; (delta-cyanobutyl) methylsiloxy; (gamma-cyanobutyl) methylsiloxy, and the like.

The average composition of the polyoxyalkylene blocks (E) of the Z units is, —$(R)'_p$—$(OC_aH_{2a})_b$—OG, wherein: $p$ is zero or 1; —R'— comprises a bivalent alkylene group a carbon atom of which is bonded to silicon of the Z units; —$(OC_aH_{2a})_b$— represents a polyoxyalkylene chain having an average oxyethylene content of at least 75 weight percent; and G is an organic cap. In the chain, —$(OC_aH_{2a})_b$—, $a$ can have a value from 2 to 4 provided at least 75 weight percent of the total polyoxyalkylene content of the polymer is constituted of oxyethylene units, and $b$ has an average value from about 3 to about 30. Usually, the average value of $b$ is from about 4 to about 15, and the average value of $a$ is from 2 to 2.25. The other oxyalkylene units with which oxyethylene may be in combination are oxypropylene, —$(C_3H_6O)$—, and oxybutylene, —$(C_4H_8O)$—, units. When the oxyethylene units are present in combination with other oxyalkylene units, the units of different types can be randomly distributed throughout the poly(oxyalkylene) chain or they can be grouped in respective sub-blocks, provided the total average content of —$(C_2H_4O)$— is at least 75 weight percent. Preferably, the total average poly(oxyethylene) content of the chain, —$(C_aH_{2a}O)_b$—, is from about 85 to about 100 weight percent.

When present, the linking group (—R'—) between silicon and that portion of the polyoxyalkylene block shown as —$(OC_aH_{2a})_bOG$, is a bivalent alkylene group, an alkylene—C(O)— group or an -alkylene-NH—C(O)— group wherein the free valence of alkylene is bonded to silicon. In these linking groups, alkylene has the more specific formula —$C_eH_{2e}$—, where $e$ has a value from 2 to 6 and is usually no more than four.

Illustrative of suitable groups encompassed by R' are: ethylene, trimethylene, propylene, tetramethylene, hexamethylene; corresponding —$C_eH_{2e}$—C(O)— groups which together with oxygen of the polyoxyalkylene chain form an ester linkage; and corresponding —$C_eH_{2e}$—NHC(O)— groups which in combination with oxygen of the polyoxyalkylene chain form carbamate linkages.

As further indicated by the formula of the polyoxyalkylene blocks (E) of the Z units, the poly(oxyalkylene) chain is terminated by the organic group, GO— wherein G is a monovalent organic capping group. Illustrative of the organic caps encompassed by G are such groups as: $R^\infty$—, $R^\infty NHC(O)$—, and $R^\infty C(O)$—, wherein $R^\infty$ is a monovalent hydrocarbon radical having from 1 to 12 carbon atoms, and is usually free of aliphatic unsaturation. The groups (GO—) which endblock the polyoxyalkylene chains are, therefore, corresponding $R^\infty O$—, $R^\infty NHC(O)O$— and $R^\infty C(O)O$— monovalent organic radicals. In the aforesaid capping (G) and terminal (GO—) groups, $R^\infty$ can be any of the following: an alkyl group including linear and branched chain alkyl groups having the formula, $C_fH_{2f+1}$—, wherein $f$ is an integer from 1 to 12, such as, for example, methyl, n-propyl, isopropyl, n-butyl, octyl and dodecyl groups; a cycloaliphatic radical including monocyclic and bicyclic groups such as, for example, cyclopentyl, cyclohexyl and bicyclo[2.2.1]heptyl groups; an aromatically unsaturated group including aryl, alkaryl and aralkyl radicals such as, for example, phenyl, naphthyl, xylyl, tolyl, cumenyl, mesityl, t-butylphenyl, benzyl, betaphenylethyl and 2-phenylpropyl groups; alkyl- and aryl- substituted cycloaliphatic radicals such as, for example, methylcyclopentyl and phenylcyclohexyl radicals; and the like. It is evident, therefore, that the terminal group (GO—) of the polyoxyalkylene chain can be corresponding alkoxy, aryloxy, aralkoxy, alkaryloxy, cycloalkoxy, acyloxy, aryl—C(O)O—, alkyl carbamate and aryl carbamate groups.

The generally preferred $R^\infty$ groups are phenyl, lower alkyl radicals, the lower alkyl-substituted aryl groups and the aryl-substituted lower alkyl groups, wherein the term "lower alkyl" denotes $C_1$-$C_4$ alkyl radicals. Therefore, illustrative of the preferred capping groups represented by G are: methyl, ethyl, propyl, butyl, phenyl, benzyl, phenylethyl ($C_6H_5$—$C_2H_4$—), acetyl, benzoyl, methylcarbamyl [$CH_3NHC(O)$—], ethylcarbamyl [$C_2H_5NHC(O)$—], propyl- and butyl-carbamyl groups, phenylcarbamyl [$C_6H_5NHC(O)$—], tolylcarbamyl [$(CH_3)C_6H_4NHC(O)$—], benzylcarbamyl [$C_6H_5CH_2NHC(O)$—], and the like.

It is to be understood that the terminal organic radical (GO—) of the respective polyoxyalkylene blocks of the polymers of this invention may be the same throughout the polymer or may differ. For example, the polymer compositions of this invention can contain polyether blocks in which the terminal group (GO—) is methoxy, and other polyether groups in which GO— is a hydrocarbyl-carbamate group such as methylcarbamate, $CH_3NHC(O)O$—, or benzyloxy ($C_6H_5CH_2O$—).

As previously described, an average of from about 50 to about 85 weight percent of the cyano-substituted siloxane-polyoxyalkylene polymers of the invention is constituted of polyoxyalkylene blocks (E) which portion of the polymers is also referred to herein as the total polyether content. Correspondingly, the total siloxane content of the polymers is from about 50 to about 15 weight percent, and represents the sum of the combined weight of (1) the M units, (2) the X units, when present, (3) the Y units, and (4) the Z units less the total weight of the polyoxyalkylene blocks (E). Within these respective ranges of polyether and siloxane content, the ratio of the combined number of moles of the X and Y units to the number of moles of Z units (that is, with specific reference to Formula I, the mole ratio of $x+y$:$z$) is usually from about 0.5:1 to about 6:1.

In the M and X units, the alkyls (R) are of course bonded to silicon by silicon-to-carbon bonds as are the respective alkyls of the Y and Z units. On the other hand, the respective cyano-bearing and E moieties of the Y and Z units, may be bonded to silicon through silicon-to-carbon or silicon-to-oxygen bonds, as shown in the following general formula:

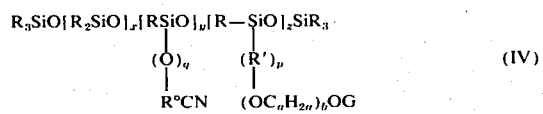

(IV)

wherein, as previously defined, $q$ and $p$ may independently be zero or 1. Thus, the cyano-substituted organosiloxanepolyoxyalkylene polymers of the invention may be: (1) non-hydrolyzable with respect to both the polyoxyalkylene block and cyano-substituted groups (when $p$ is 1 and $q$ is zero); (2) hydrolyzable with respect to both the polyoxyalkylene block and cyano-substituted groups (when $p$ is zero and $q$ is 1); (3) hydrolyzable with respect to the polyoxyalkylene block and non hydrolyzable with respect to the cyano-substituted groups (when both $p$ and $q$ are zero); and (4) non hydrolyzable with respect to the polyoxyalkylene block and hydrolyzable with respect to the cyano-substituted groups (when both $p$ and $q$ are 1).

Preferred polymers of this invention are those having the following average compositions:

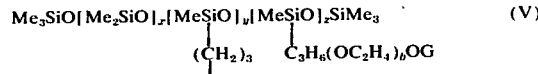 (V)

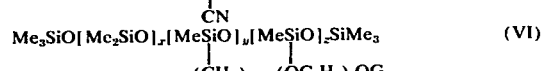 (VI)

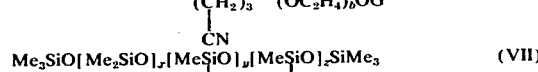 (VII)

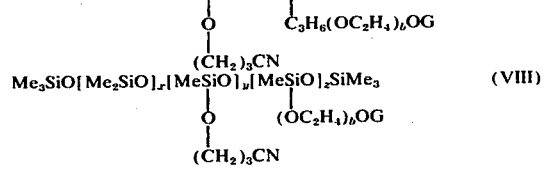 (VIII)

wherein: Me represents methyl; G is $R^\infty$—, $R^\infty C(O)$— or $R^\infty NHC(O)$— in which $R^\infty$— is lower alkyl, phenyl or ar(lower) alkyl; $x$ is zero or a positive number up to about 20, $y$ has an average value from about 2 to about 20, $z$ has an average value from about 2 to about 30, and $b$ has an average value from about 3 to about 30, provided the values of $x$, $y$, $z$ and $b$ in any given polymer composition are such that the siloxane and polyether contents are within the aforesaid ranges from about 15 to about 50 (siloxane) and from about 85 to about 50 (polyether) weight percent. From the standpoint of relative proportions of siloxy units, the preferred polymers of the invention are those having the average composition encompassed by Formulas III–VIII wherein: $x$ is from about 1 to about 10, $y$ is from about 2 to about 10, $z$ is from about 2 to about 15, and the average value of the molar ratio $x+y$:$z$ is from about 0.5:1 to about 4:1, and most preferably is no more than about 3:1.

The polymers of the invention are prepared by any one of a number of reactions, the particular method employed depending primarily on whether the polyoxyalkylene blocks are linked to silicon through an Si—C or Si—O—C linkage and whether the cyano-substituted groups are bonded to silicon directly by an Si—C bond or through an Si—O—C link.

One method for providing the polymer compositions in which the polyoxyalkylene blocks are linked to the siloxane backbone through Si—C comprises the platinum-catalyzed addition of monoolefinic polyoxyalkylene ethers to the cyano-substituted polyalkylsiloxane hydride fluids encompassed by Formula II hereinabove. This hydrosilation reaction is referred to herein as Method A and is illustrated by the following equation:

Equation 1:

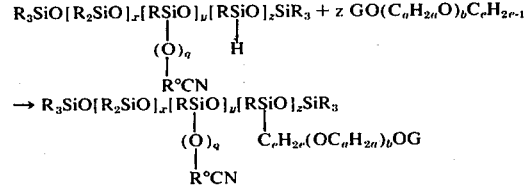

wherein R, R°, G, $x$, $y$, $z$, $a$, $b$ and $e$ have the aforesaid significance. Preferably, the monoolefinic group, —$C_eH_{2e-1}$, of the polyether reactant employed in Method A is vinyl, allyl or methallyl, the allyl end-blocked reactants being especially suitable. One method for preparing such polyether reactants comprises starting alkylene oxide polymerization with an alkenol having at least three carbon atoms such as allyl alcohol to provide HO($C_aH_{2a}O)_bC_eH_{2e-1}$ (wherein$e$ has a value of at least 3), followed by capping of the terminal hydroxyl group with the aforesaid organic radical G—, such as methyl, phenyl, benzyl, acetyl, methylcarbamyl and like capping groups. Further details concerning the method of preparation of such polyether reactants are as described in British Patent Specification Nos. 1,220,471 and 1,220,472. Alternatively, the polyether reactants can be prepared by starting the alkylene oxide polymerization with an alkanol such as methanol or butanol, an aralkyl alcohol such as benzyl alcohol, phenol and the like, followed by capping of the terminal hydroxyl group of the reaction product with the monoolefinic group such as vinyl, allyl, methallyl and the like. Of these monoolefinically unsaturated polyether reactants, allyl alcohol-started polyoxyalkylene ethers are especially suitable. It is to be understood that the polyoxyalkylene chain, —($C_aH_{2a}O)_b$—, of the polyether reactants is composed of at least 75, preferably at least 85, weight percent of oxyethylene units, —($C_2H_4O$)—, the remaining oxyalkylene units being oxyethylene, oxypropylene and/or oxybutylene, as described hereinabove with reference to the nature of the polyoxyalkylene blocks (E) of the copolymeric product. When oxyethylene is in combination with other oxyalkylene units, the various oxyalkylene units can be randomly distributed throughout the chain such as when a mixture of alkylene oxides is polymerized, or they can be arranged as sub-blocks such as when the respective alkylene oxides are polymerized sequentially.

The polymers of this invention wherein the polyoxylene blocks are joined to silicon through an Si—O—C bond (that is, the compositions encompassed by Formula IV above wherein $p$ is zero), are provided by the catalyzed condensation of silicon-bonded hydrogen of the cyano-substituted polyalkylsiloxane hydride fluids with hydrogen of the —OH group of hydroxyl-terminated polyether reactants. This method is referred to herein as Method B and is illustrated by the following reaction:

Equation 2:

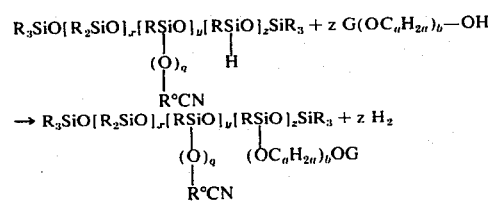

wherein R, R°, G, $x$, $y$, $z$, $a$ and $b$ are as previously defined.

When the cyano-substituted group $[-(O)_qR°CN$, also expressed herein as $-(O)_qC_cH_{2c}CN]$ of the Y units of the polymers of this invention is bonded to silicon by an Si—C bond, that is, when $q$ is zero, the polymers may also be prepared by a third method, referred to herein as Method C. The latter method comprises the platinum-catalyzed hydrosilation of cyano-substituted alkenes having the formula, $C_cH_{2c-1}$—CN, where $c$ has a value of at least 3, employing polyalkylsiloxane hydride fluids. In accordance with one embodiment of Method C, the hydrosilation of the cyano-substituted alkene is carried out concurrently with hydrosilation of the monoolefinically end-blocked polyether reactant as illustrated by the following equation wherein allyl cyanide is shown as the cyano-alkene reactant:

Equation 3:

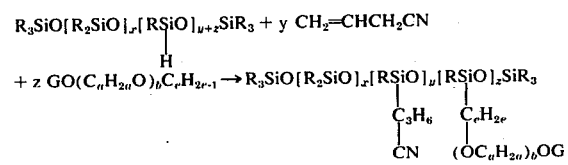

It is to be understood that the reaction of Equation 3 may also be carried out by first hydrosilating $z$ moles of the polyether reactant to provide an intermediate having the average composition,

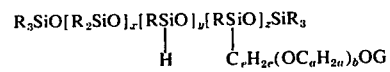

which is then reacted with $y$ moles of allyl cyanide to provide the product shown in Equation 3.

In accordance with still another embodiment of Method C, the polyalkylsiloxane hydride fluid shown in Equation 3 is reacted initially with $y$ moles of the cyanoalkene followed by reaction of the intermediate cyanoalkyl-modified polyalkylsiloxane hydride with $z$ moles of either the monoolefinically unsaturated polyether reactant shown in Equation 1 or the hydroxyl-terminated polyether reactant shown in Equation 2. This sequence of reactions is illustrated by Equations 3a–3c wherein allyl cyanide is shown as the cyano-alkene reactant:

Equation 3a:

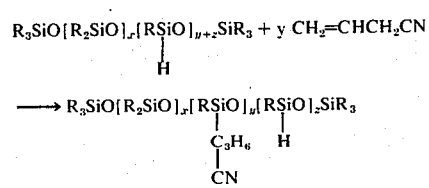

Equation 3b:
Product of Equation 3a + z $GO(C_aH_{2a}O)_bC_eH_{2e-1}$

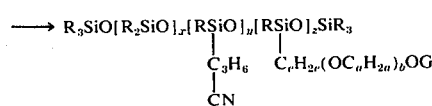

Equation 3c:
Product of Equation 3a + z $G(OC_aH_{2a})_b$-OH

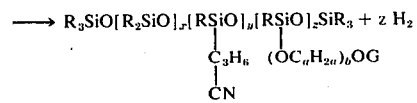

wherein R, G, $a$, $b$, $e$, $x$, $y$ and $z$ are as previously defined. When R is methyl and the polyether reactants are $GO(C_2H_4O)_bCH_2CH=CH_2$ and $GO(C_2H_4O)_b$—H, the polymer products of Equations 3b and 3c have the average compositions shown hereinabove by Formulas V and VI, respectively.

When the cyano-substituted groups, $(O)_qR°CN$, of the siloxane-polyoxyalkylene block copolymers of this invention are bonded to silicon by Si—O—C linkages, that is, when $q$ is 1, the polymers are prepared by a fourth method, referred to herein as Method D. The latter method comprises hydrogen condensation of Si—H and HO—C groups derived respectively from polyalkylsiloxane hydrides and cyano-substituted alkanols having the formula, HO—$C_cH_{2c}$—CN, where $c$, as previously defined, is from 2 to 12 and is usually no more than 6. In accordance with one embodiment of Method D, the condensation reaction is carried out simultaneously with hydrogen condensation of Si—H of the polyalkylsiloxane hydride and HO—C of hydroxyl-terminated polyether reactants, as shown by the following equation:

Equation 4:

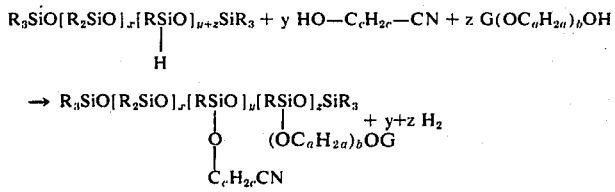

wherein R, G, $a$, $b$, $c$, $x$, $y$ and $z$ have the above-defined significance. It is to be understood that the reaction of Equation 4 may also be carried out by first reacting $z$ moles of the polyether reactant with the polyalkylsiloxane hydride to provide an intermediate having the average structure:

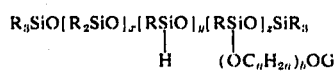

which is then reacted with $y$ moles of the cyano-alkanol to provide the polymer product shown in Equation 4. In accordance with another embodiment of Method D, the polyalkylsiloxane hydride fluid is partially reacted initially with $y$ moles of the cyano-alkanol followed by reaction of the intermediate cyanoalkoxy-modified Si—H fluid with $z$ moles of either the monoolefinically unsaturated polyether reactant shown in Equation 1 or the hydroxyl-terminated polyether reactant shown in Equation 2. This sequence of reactions is illustrated by the following Equations 4a–4c:

Equation 4a:

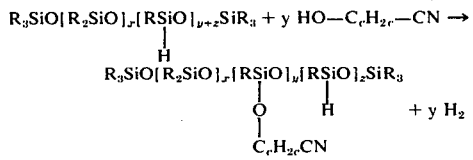

Equation 4b:

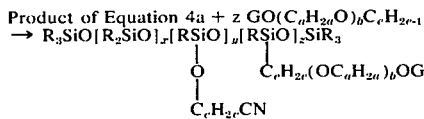

Equation 4c:

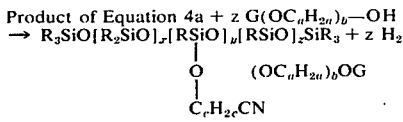

wherein R, G, $a$, $b$, $c$, $e$, $x$, $y$ and $z$ are as previously defined. When R is methyl and $c$ is three, and the polyether reactants are $GO(C_2H_4O)_bCH_2CH=CH_2$ and $GO(C_2H_4O)_b$—H, the polymer products of Equations 4b and 4c have the compositions shown hereinabove by Formulas VII and VIII, respectively.

The hydrosilation reactions illustrated by Equations 1, 3, 3a, 3b and 4b, which overall comprise the addition of Si—H to the respective monoolefinic groups of the polyether and cyano-alkene reactants, are effected in the presence of a platinum catalyst. Particularly effective is platinum in the form of chloroplatinic acid dissolved, if desired, in a solvent such as tetrahydrofuran, ethanol, butanol or mixed solvents such as ethanol-ethylene glycol dimethyl ether. It is to be understood, however, that other platinum derivatives known to the art as hydrosilation catalysts may also be used. The platinum is present in a catalytic amount such as from about 5 to about 300 parts per million (p.p.m.) parts be weight of the combined weight of the silicon-containing and organic reactants. The more usual platinum concentration is from about 5 to about 150 p.p.m. Suitable reaction temperatures range from about room temperature (25°C.) to about 200°C., and are more usually from about 60°C. to about 150°C.

The condensation reactions illustrated by Equations 2, 3c, 4, 4a and 4c which comprise the reaction of silanic hydrogen (Si—H) and hydrogen of the —OH groups of the hydroxyl-terminated polyether and cyano-alkanol reactants, are promoted by a variety of catalysts such as organic derivatives of tin, platinum and other transition metals. Especially suitable are organic derivatives of tin such as tin carboxylates which are typically illustrated by stannous octoate, stannous oleate, stannous laurate and dibutyl tin dilaurate. These catalysts are employed in amounts from about 0.1 to about 5, and usually no more than about 2, weight percent, based on the total weight of the reactants. The Si—H/HO—C condensation reactions are effected at temperatures from about 60°C. to about 150°C., more usually from about 80°C. to about 120°C.

The various reactions of Equations 1 through 4c are usually carried out employing the organic reactants (that is, the polyether, cyano-alkene and cyano-alkanol) in amounts at least sufficient to react with a predetermined proportion of the silicon-bonded hydrogen of the Si—H reactant. From the standpoint of more effective and more complete reaction of silanic hydrogen, the organic reactants are usually employed in excess of stoichiometric requirements. In those reactions (Equations 1, 2, 3b, 3c, 4b and 4c) wherein the Si—H groups are to be completely reacted with only one of the organic reactants to form the desired final polymer, the organic reactant may be employed in amounts up to a 100 or more weight percent excess. In the case of the polyether reactant, however, usually no more than about a 50 weight percent excess is used. On the other hand, when the Si—H reactant is either partially reacted initially with one of the organic reactants as shown, for example, by Equations 3a and 4a, or is reacted with the polyether and cyano-substituted reactants concurrently as shown by Equations 3 and 4, the organic reactants are employed in an amount just sufficient to satisfy the predetermined stoichiometric requirements of the desired reaction or only a small excess such as up to about 50 (e.g., 20 to 25) weight percent is used.

The hydrosilation and condensation reactions may be conducted in the absence or presence of a solvent. When used, the solvent is one which is substantially non reactive with Si—H under the reaction conditions. Therefore, the use of hydroxyl-containing solvents including alcohols such as methanol, ethanol, propanol and ether alcohols, as the medium in which the reaction is carried out should be avoided. Suitable non reactive solvents are the normally liquid aromatic hydrocarbons such as benzene, toluene and xylene, although other non reactive solvents such as ethers can also be used. Upon completion of the respective hydrosilation and condensation reactions, any unreacted cyanoalkene or cyano-alkanol, or any organic solvent employed in the polymer preparation, may be removed by conventional separation techniques to obtain the final produce comprising the polymer compositions of the invention. It is to be understood that some portion of the solvent and excess reactants may remain in the product and that such diluted polymer compositions are within the scope, and may be used in accordance with the teachings, of this invention. In the hydrosilation reactions, the removal or neutralization of the chloroplatinic acid catalyst is usually desirable for long range product stability. Neutralization is readily effected by adding sodium bicarbonate to the reaction mixture followed by filtration of the resultant slurry to remove the neutralizing agent and platinum residues.

The cyano-substituted polyalkylsiloxane hydride fluids encompassed by Formula II and employed in the reactions of Equations 1, 2, 3b, 3c, 4b and 4c, are in turn provided by any one of a number of methods. The particular method employed depends upon whether the cyano-bearing siloxy units (Y) are

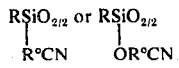

and whether X ($R_2SiO_{2/2}$) units are desired in the final copolymer product. Overall, the methods employed in providing the cyano-substituted Si—H fluids encompassed by Formula II comprise the use of various combinations of the following precursor reactants as the source of the indicated units or groups:

a. Hexaalkyldisiloxanes, $R_3SiOSiR_3$, as the source of the endblocking M units, $R_3SiO_{1/2}$;

b. Cyclic dialkylsiloxane polymers, $[R_2SiO]_d$, where $d$ usually has an average value of from about 3 to about 6, as the source of the difunctional dialkylsiloxy units (X), $R_2SiO_{2/2}$, when such X units are to be incorporated;

c. Trialkyl-endblocked dialkylsiloxane polymers, $R_3SiO(R_2SiO)_rSiR_3$, where $r$ has an average value of at least 2 and is usually no more than about 10, as the source of the endblocking units, $R_3SiO_{1/2}$, and as a source of the dialkylsiloxy units, $R_2SiO_{2/2}$, when the latter units are desired in the final copolymer product;

d. Cyanoalkyl-alkylsiloxane polymers as the source of the

units encompassed by the unit formula of Y, where R° as previously defined, is the bivalent alkylene radical, —$C_cH_{2c}$—, $c$ having a value from 2 to 12, the said polymers being formed by the hydrolysis of cyanoalkylalkyldichlorosilanes, NC—R°(R)SiCl$_2$, followed by the base-catalyzed dehydration-cyclization of the hydrolyzate to form cyclics having the formula, [NC—R°(R)SiO]$_w$, the average value of $w$ being 3 or more;

e. Polymeric alkylsiloxane hydride fluids having an Si—H content sufficient to provide from about 200 to about 372 cubic centimeters of hydrogen per gram, as the source of the

or Z° units of the Si—H fluids;

f. Cyano-substituted alkenes, $C_cH_{2c-1}CN$, where $c$ is from 3 to 12, as the source of the NC—R°— groups of the NC—R°—(R)SiO$_{2/2}$ units, where R° is more particularly shown as the bivalent alkylene radical, —$C_cH_{2c}$—; and g. Cyano-substituted alkanols, HO—R°—CN, as the source of the NC—R°O— groups of the NC—R°O(R)SiO$_{2/2}$ units, where R° is also more particularly shown as the bivalent alkylene radical, —$C_cH_{2c}$—, $c$ having a value from 2 to 12.

One method for providing the cyanoalkyl-substituted polyalkylsiloxane hydrides encompassed by Formula II wherein Y has the unit formula,

that is compositions having the following Formula II-A wherein —R°— is more particularly shown as —$C_cH_{2c}$—,

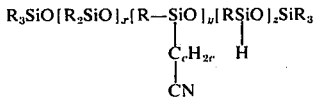

comprises equilibration of reactant (a) with reactants (d) and (e) and when $x$ is a positive number, with reactants (b) and/or (c). These reactions are illustrated by the following Equations (5) and (6) in which polymeric reactants (b), (d) and (e) are shown, for convenience, simply as the siloxy units which they provide in chemically combined form:

Equation 5:

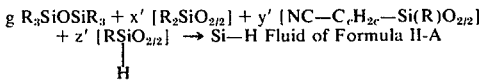

Equation 6:

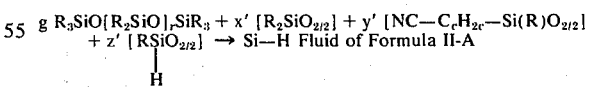

wherein: R as previously defined is alkyl having one to ten carbon atoms and is preferably lower alkyl; $c$ has a preferred value of 2 to 6; and in the Si-H fluid product, $x$ is zero or any positive number having an average value up to about 20, $y$ has an average value from about 2 to about 20, and $z$ has an average value from about 2 to about 30. In the above Equations 5 and 6 and other equations hereinbelow, $g$ represents the actual number of moles of the indicated reactant, and $x'$, $y'$ and $z'$ represent the actual number of moles (or mole-equivalents) of the indicated monomeric units provided by the polymeric source of such units, that is, reactants (b), (d) and (e). It is to be understood, therefore, that $g$, $y'$ and $z'$ and when X units are present, $x'$, can be any positive numbers depending upon the scale on which the reactions are run, provided that when normalized on the basis of $g=1$, the average values of the mole ratios $x':y':z'$ (Equation 5) and $[x'+(g \times r)]:y':z'$ (Equation 6) are 0–20:2–20:2–30, respectively, thereby providing Si—H fluids wherein the ratio $x:y:z$ has a corresponding average value of 0–20:2–20:2–30, as previously defined.

In providing the Si—H fluids by the one-step reactions of Equations 5 and 6, standard base-catalyzed equilibration reaction conditions are not suitable in view of the base-sensitivity of the Si—H groups. Therefore, the equilibration reactions of Equations 5 and 6 are promoted by acid catalysts. Suitable catalysts for this purpose are trifluoromethylsulfonic acid ($CF_3SO_3H$) and concentrated (90–98 weight percent) sulfuric acid. The catalyst is usually employed in a concentration of from about 0.1 to about 4 weight percent, based on the total weight of reactants. The acid-catalyzed equilibration reactions of Equations 5 and 6 are carried out with vigorous mechanical stirring at temperatures within the range from about 20°C. to about 120°C. at least until the reaction mixture becomes homogeneous. Effecting the reaction at temperatures of 20°–50°C. usually provides a satisfactory rate of reaction. After completion of the reaction, the reaction product is neutralized with base such as sodium bicarbonate and filtered, sometimes adding a liquid hydrocarbon such as xylene or toluene to facilitate the filtration. When a diluent is used, it is conveniently separated from the reaction product by rotary vacuum evaporation.

In addition to the one-step reactions of Equations 5 and 6, the cyano-substituted polyalkylsiloxane hydrides having Formula II-A may also be prepared in step-wise manner as shown by the sequence of reactions of Equations 7a and 7b:

Equation 7a:

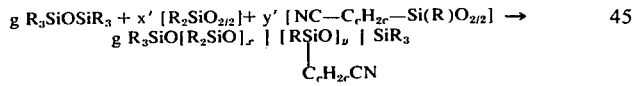

Equation 7b:

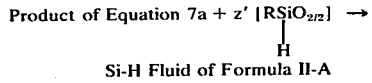

In view of the fact that the Si—H reactant is not used in the reaction of Equation 7a, it may be effected in the presence of conventional alkaline equilibration catalysts useful in the preparation of unmodified polyalkylsiloxanes. Illustrative of such alkaline catalysts are potassium silanolate, cesium hydroxide and tetramethyl ammonium silanolate. Such promoters are usually employed in concentrations of from about 30 to 50 p.p.m., based on the total weight of reactants. The temperature at which the base-catalyzed equilibration reaction of Equation 7a is carried out depends largely on the catalyst employed. Thus, when tetramethyl ammonium silanolate is used, suitable reaction temperatures are from about 75°C. to about 100°C., preferably from about 80°–90°C. The other alkaline catalysts usually require higher temperatures such as at least about 150°C. to about 200°C. The further reaction of the product of Equation 7a to introduce the

units, as shown by Equation 7b, is carried out in the presence of an acid equilibration catalyst as described with specific reference to the reactions of Equations 5 and 6.

A third route to the cyanoalkyl-substituted polyalkylsiloxane hydrides encompassed by Formula II-A comprises the use of cyano-alkenes, described above as reactant (f), as the source of the cyanoalkyl groups, as illustrated by the following sequence of reactions wherein allyl cyanide is shown as the cyano-alkene reactant:

Equation 8a:

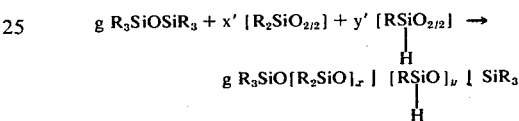

Equation 8b:

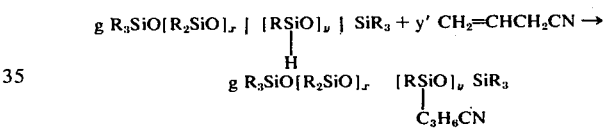

Equation 8c:

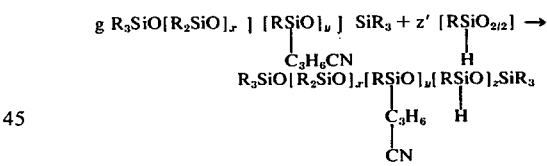

The reaction of Equation 8a is effected in the presence of acid equilibration catalysts such as trifluoromethylsulfonic acid and sulfuric acid, at temperatures usually from 20°C. to about 50°C. The reaction of Equation 8b is platinum-catalyzed and is effected under the conditions described with specific reference to the hydrosilation reactions shown, for example, by Equation 1. The reaction of Equation 8c is acid-catalyzed and is carried out under the conditions described with reference to Equations 5 and 6, employing an acid equilibration catalyst. Prior to the further reaction of the intermediate cyanoalkyl-substituted fluid provided by Equation 8(b), however, it is desirable to separate any unreacted cyano-alkene or isomerized derivatives thereof, in order to minimize any tendency of such compounds to react with the acid catalyst employed in the reaction of Equation 8c.

In providing the cyanoalkyl-substituted polyalkylsiloxane hydrides encompassed by Formula II-A, various modifications of the reactions of Equations 5–8c may be had without departing from the scope of the invention. For example, instead of introducing the

units in two stages (Equations 8a and 8c), such units may be introduced during the reaction of Equation 8a in a predetermined amount sufficient to provide the total desired amount $(y' + z')$ followed by partial reaction of the Si—H groups with $y'$ moles of cyano-alkene reactant. This latter embodiment is illustrated by the hydrosilation reaction of Equation 3a above.

It is also evident that when the R group of each of the reactants shown in Equations 5–8c is methyl (Me) and $c$ in each instance has a value of 3, the resulting cyanopropyl-modified polymethylsiloxane hydride products have the following average compositions:

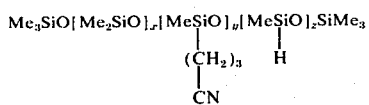  II-A-1

These Si—H fluids are useful in providing polysiloxane-polyoxyalkylene block copolymers encompassed by Formulas V and VI, by the hydrosilation or hydrogen condensation reactions of Equations 1 and 2, employing as the polyether reactants, the above-described monoolefinically endblocked or hydroxyl-terminated polyoxyethylene ether reactants having the formulas, $GO(C_2H_4O)_bCH_2CH=CH_2$ and $GO(C_2H_4O)_b$—H, respectively.

In providing the cyanoalkoxy-substituted polyalkylsiloxane hydrides emcompassed by Formula II wherein Y has the unit formula,

that is, compositions having the following Formula II-B wherein —R°— is more particularly shown as —$C_cH_{2c}$—,

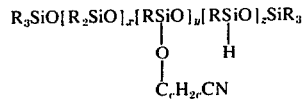  II-B a cyano-substituted alkanol, HO—$C_cH_{2c}$—CN, described above as reactant (g), is suitably employed as the source of the cyanoalkoxy group. Such Si—H fluids are prepared by methods which comprise the condensation of silanic hydrogen of polyalkylsiloxane hydrides with hydrogen of the HO—C groups of the cyanoalkanols. One such method is as illustrated by the reaction of Equation 4a, which as previously described herein, is usually promoted by catalysts comprising tin such as stannous octoate. By way of specific illustration, cyanopropoxy-substituted polymethylsiloxane hydrides having the average composition:

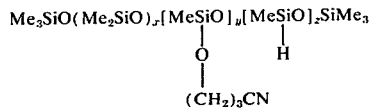  II-B-1 are provided by the reaction of the following Equation 9 employing 3-cyanopropanol as the source of the 3-cyanopropoxy groups:

Equation 9:

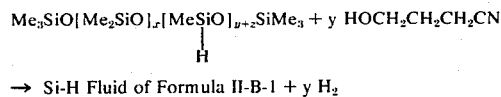

→ Si-H Fluid of Formula II-B-1 + y H$_2$

The reaction of Equation 9 is carried out in the presence of the metal catalysts, preferably tin carboxylates such as stannous octoate, as described, for example, with specific reference to the reaction of Equation 2.

The Si—H fluids having Formula II-B-1 are useful in providing the polysiloxane-polyoxyalkylene block copolymers encompassed by Formulas VII and VIII by the hydrosilation or hydrogen condensation reactions of Equations 1 and 2, employing as the polyether reactants the above-described monoolefinically endblocked or hydroxyl-terminated polyoxyethylene ethers, $GO(C_2H_4O)_bCH_2$—CH=CH$_2$ and GO—(C$_2$H$_4$O)$_b$—H, respectively.

The cyano-substituted polyalkylsiloxane hydrides having the average composition expressed by Formula II (including Formulas II-A, II-B, II-A-1 and II-B-1) wherein $x$ is zero or a positive number having an average value less than about 10 such as from about 0.1 to about 9.5, are new compositions. Cyano-substituted polyalkylsiloxane hydrides in which $x$ has an average value from about 10 to about 200, $y$ has an average value from about 3 to about 100, and $z$ has an average value from about 2 to about 30, are described and claimed in our prior and copending application Ser. No. 279,883, filed Aug. 11, 1972, now U.S. Pat. No. 3,846,462.

The organosilicone polymers described herein including the cyano-substituted siloxane-polyoxyalkylene copolymers encompassed by Formula I and the cyano-substituted Si—H fluids encompassed by Formula II, are normally liquid compositions and, as previously described, comprise mixtures of polymer species which differ in molecular weight, polyether and siloxane contents and relative number of monomeric units. Generally, the average molecular weight of the copolymers ranges from about 800 to about 50,000 (as measured by Gel Permeation Chromatography using a calibration curve based on dimethylsiloxane fluids.) It is to be understood that two or more block copolymers or two or more Si—H fluids having a particular average composition encompassed by respective Formulas I and II may be admixed in suitable relative proportions to adjust the average values of $x$, $y$ and $z$, as desired. For example, a block copolymer wherein $y$ has an average value of about 5 may be admixed with another composition wherein $y$ has an average value of about 2 to provide a siloxane-polyoxyalkylene block copolymer wherein $y$ has an average value of about 3.5. Similarly, a cyano-substituted Si—H fluid encompassed by Formula II in which no R$_2$SiO$_{2/2}$ units are present (that is, in which $x$ is zero), may be admixed in any relative proportion with an Si—H fluid in which $x$ is 1, thereby providing a product in which the average value of $x$ is less than 1 (such as, for example, 0.1, 0.5, etc.) which is then reacted as described herein to provide a siloxane-polyoxyalkylene copolymer in which $x$ has a corresponding average value. It also is to be understood that a small percentage (on the average, usually about 15 mole percent or less) of the polyoxyalkylene blocks may comprise residual, uncapped hydroxyl-terminated groups introduced with the polyoxyalkylene ether reactants.

The cyano-substituted siloxane-polyoxyalkylene copolymers of this invention are effective as stabilizers of flexible polyester urethane foams and can, therefore, be used as such without the need for combination with an anionic or cationic organic surfactant, or other type of organic additive. The polymers can be employed as a 100 percent active stream, or they can be employed in dilute form as a solution in polar solvents (e.g., glycols) or non-polar organic solvents such as normally liquid aliphatic and aromatic unsubstituted and halogen-substituted hydrocarbons (e.g., heptane, xylene, toluene, chlorobenzenes and the like). In addition to the polymers, the other essential types of components and reactants employed in the production of flexible polyester urethane foam in accordance with the process of this invention are polyester polyols, organic polyisocyanates, amine catalyst and blowing agent. When producing self-extinguishing foams, the foam-producing reaction mixture also contains a flame-retardant. The amount of organosilicone polymers of this invention present in the final foam-producing reaction mixture may vary over a relatively wide range such as from about 0.15 to about 4.0 parts by weight per 100 parts by weight of the polyester polyol reactant, and is usually at least 0.3 and no more than about 2 parts.

It is to be understood that the cyano-substituted siloxane-polyoxyalkylene block copolymers of the invention can be used in combination with other types of silicon-containing surfactants. For example, the copolymers described herein may be in combination with block copolymers in which the backbone of the siloxane blocks is substituted only with silicon-bonded methyl or other alkyl groups such as the copolymers described in the aforementioned U.S. Pat. No. 3,594,334, as exemplified by the copolymer of Surfactant AA described in greater detail in the examples. Other organosilicones which can be used in combination with the surfactants of this invention are those containing monofunctional trialkylsiloxy units (e.g., $Me_3SiO_{1/2}$) in combination with tetrafunctional siloxy units (i.e., $SiO_{4/2}$) and polyfunctional siloxy units bearing a polyoxyalkylene group (e.g., $Me(E)SiO_{2/2}$) in the relative proportions described in U.S. Pat. No. 3,793,360. Of the class of stabilizers described in the latter patent, those having the following average formula are especially preferred for use in combination with the copolymers of the present invention:

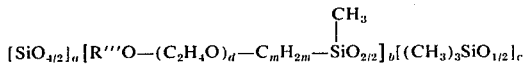

wherein: $d$ has an average value of from 5 to about 15; $m$ has a value from 2 to 4; the mole ratio $a:b:c$ has an average value of 0.4–2:1:0.2–2, and $R'''$ is phenyl, lower alkyl such as methyl, lower alkaryl or aryl-substituted lower alkyl groups such as benzyl. When used, the additional organosilicone is used in a minor amount which is usually from about 1 to about 30 parts by weight per 100 parts by weight of the block copolymer of this invention.

It is often the preferred practice of foam manufacturers to premix the foam stabilizer, amine catalyst and water (which is the usual source of at least part of the blowing action), and to feed the aqueous premixture to the foam-producing reaction mixture as a single stream. The mere mixing of the cyano-substituted siloxane-polyoxyalkylene copolymers of this invention with the catalyst and water, however, forms a heterogeneous mixture which detracts from the processing advantage of adding these components as a combined stream rather than as individual streams. The problem of premix incompatibility is overcome in accordance with the present invention by providing homogeneous aqueous premixtures comprising the cyano-substituted siloxane-polyoxyalkylene copolymer, amine catalyst, an organic acidic component and, as an additional ingredient, either a water soluble organic surfactant or a water soluble glycol, or both of the latter two types of components. Although these various organic additives can be introduced directly to the aqueous premixture of foam stabilizer and catalyst, the formation of clear, homogeneous aqueous solutions is facilitated by blending the additives with the foam stabilizer (that is, the organosilicone polymers of this invention) and combining the resulting blend with water and the amine catalyst system. In accordance with another embodiment of this invention, therefore, solution compositions are provided comprising the organosilicone polymers of this invention, the aforesaid organic acidic component, and one or both of an organic surfactant and glycol. The organosilicone polymer is present in the solution compositions in an amount of from about 10 to about 80 parts by weight per 100 parts by weight of the solution.

The aforesaid organic acidic component comprises the saturated and unsaturated aliphatic and cycloaliphatic carboxylic acids containing from 15 to 20 carbon atoms. Illustrative of suitable acidic components are the fatty acids such as, for example, palmitic, stearic, palmitoleic, oleic, linoleic, linolenic and ricinoleic acids; resin acids of the abietic and pimaric type; and any combination of the aforesaid acids as well as industrial by-products and naturally-occurring materials comprising such acids. An especially suitable acidic component of the solution compositions and aqueous premixtures of this invention is tall oil which is a by-product of sulfate digestion of wood pulp and is composed largely of fatty acids (oleic, linoleic, linolenic and palmitic acids) and resin acids, and a minor amount of neutral material such as fatty acid esters.

The above-described organic acidic component is present in the solution compositions of this invention in an amount of from about 5 to about 90 parts by weight per 100 parts by weight of organosilicone polymer present in the solution.

The water-soluble organic surfactant which can be a component of the solution compositions of this invention may be of the non ionic, anionic, cationic or amphoteric types, including combinations thereof. Illustrative of the types of non-ionic organic surfactants which can be employed are: the poly(oxyalkylene) ethers of the higher alcohols having from 10 to 18 carbon atoms including mixtures thereof; polyoxyalkylene ethers of alkyl-substituted phenols in which the alkyl group can have from 6 to 15 carbon atoms; and corresponding polythioalkylene adducts of the aforesaid higher alcohols and phenols. The length of the ether chain is such that appropriate hydrophilic character is provided to balance the hydrophobic portion derived from the alcohol or phenol and render the compound soluble in water. The chain may contain oxyethylene units either as essentially the sole type of unit or oxyethylene in combination with a minor amount of oxypropylene. It is preferred that the hydrophilic portion of the non ionic surfactants be composed essentially of oxyethylene monomeric units. Usually the average number of such $—OC_2H_4—$ units ranges from about 4 to about 20, although upwards of 40 such units can also be present.

Typical examples of non ionic surfactants which can be used as components of the solution compositions of this invention are the adducts produced by reaction of $k$ moles of ethylene oxide (wherein $k$ has a value of from about 4 to about 40, inclusive of whole and fractional numbers) per mole of any of the following hydrophobes including mixtures thereof: n-undecyl alcohol, myristyl alcohol, lauryl alcohol, trimethyl nonanol, tridecyl alcohol, pentadecyl alcohol, cetyl alcohol, oleyl alcohol, stearyl alcohol, nonylphenol, dodecylphenol, tetradecylphenol, and the like.

Other illustrative water soluble organic surfactants which can be present as a component of the solution compositions of this invention are the liquid, anionic organic surfactants having at least one carbon-bonded sulfonic acid group, $—SO_3H$, or an ammonium, quaternary ammonium, alkali metal or alkaline earth metal derivative of said sulfonic acid group. The sulfonic acid groups or salt derivatives thereof can be substituents on a wide variety of "backbone" organic compounds which provide the hydrophobic portion of the emulsifier. The hydrophobic portion may consist of carbon and hydrogen as in sulfonated hydrocarbons (or salt derivatives thereof) having from 10 to 25 or more carbon atoms such as alkanes, high (e.g., $C_{10}$–$C_{15}$) alkyl-substituted benzenes, and liquid petroleum fractions, as typically illustrated by sodium tetradecyl sulfonate, sodium dodecylbenzene sulfonate and sodium and potassium salts of sulfonated mineral oil. The $—SO_3H$ group or salt derivative thereof may also be a substituent on an organic backbone consisting of carbon, hydrogen and oxygen wherein oxygen is present in an ether linkage as in polyoxyalkylene groups or in a carboxylic acid ester group. Typical of such compounds are those obtained by sulfating or sulfonating oxyalkylated fatty acid esters wherein the oxyalkylation is usually effected with ethylene oxide, propylene oxide or a combination thereof. Other examples of suitable organic surfactants for use in combination with the silicon-containing foam stabilizers of the present invention are: the products obtained by reaction of amines such as diethylamine with long chain fatty acids such as oleic acid or with sulfonated $C_{10}$–$C_{15}$ alkylated aromatic hydrocarbons; taurine compounds having at least one long chain hydrocarbyl group bonded to nitrogen; and the like.

The solution compositions of this invention may also contain, as a third type of organic component, a glycol of from 2 to about 10 carbon atoms, or low molecular weight Carbowax polyethylene glycols such as, for example, Carbowax 400 which is a polyethylene glycol having a formula molecular weight range of 380–420. Especially suitable is hexylene glycol (2-methyl-2,4-pentanediol).

When both the organic surfactant and glycol components are present in the solution compositions of this invention, the combined concentration thereof ranges from about 5 to about 90 parts by weight per 100 parts by weight of the organosilicone polymer contained therein. When only one of these components is present, the concentration thereof is also within this latter range.

When the aforesaid solution compositions of the organosilicone polymers of this invention are combined with water and amine catalyst such as the catalysts described hereinbelow, clear homogeneous aqueous solutions are obtained which can be added directly to the foam-producing reaction mixture. From the standpoint of retaining these desirable characteristics of clarity and homogeneity under otherwise adverse ambient temperatures which may be encountered upon standing, storage or shipment prior to use in the foam-producing reaction, the preferred aqueous premixtures are those containing both the organic surfactant and the glycol, in addition to the organic acidic component. It is to be understood that the aforesaid solution compositions of the organosilicone polymers of this invention are also useful when added directly to the final foam-producing reaction mixture rather than being premixed with water and amine catalyst.

The solution compositions of the foam stabilizer as well as the aqueous premixtures of this invention, can contain minor amounts of other ingredients without departing from the scope of this invention. Such components include inhibitors such as for example, d-tartaric acid, tertiarybutyl pyrocatechol and di-tert-butyl-p-cresol ("Ionol"), which reduce any tendency of the foamed product to oxidative or hydrolytic instability. Further, when the foam stabilizers of this invention and/or the amine catalyst are employed as respective solutions, water soluble carrier solvents and components thereof are, of course, introduced into the aqueous premixtures without, however, any deleterious affect on the effectiveness or homogeneity of the aqueous solution premixtures.

The relative proportions of the organosilicone foam stabilizer of this invention, the amine catalyst and water in any particular solution are largely dependent upon and determined by the relative proportions of such ingredients which are desired in a particular foam-producing reaction mixture. Accordingly, in the preparation of a particular aqueous premixture of this invention, the relative proportions of the foam stabilizer, amine catalyst and water are adjusted and the aqueous premixture is added to the final foam-producing formulation in an amount sufficient to satisfy the respective functions of such components and to provide a foamed product of desired quality.

The polyester polyols employed in producing flexible foams in accordance with the process of this invention are the reaction products of polyfunctional organic carboxylic acids and polyhydric alcohols. The polyester polyols contain at least two hydroxyl groups per molecule (as alcoholic OH or as OH in COOH groups). The functionality of these acids is preferably provided by carboxy groups (COOH) or by both carboxy groups and alcoholic hydroxyl groups. The polyesters can have hydroxyl numbers from 30 to 150, and preferably have hydroxyl numbers from 45 to 65. As is well known to this art, the hydroxyl numbers are determined by, are are defined as, the number of milligrams of potassium hydroxide required for the complete neutralization of the hydrolysis product of the fully acetylated derivative prepared from 1 gram of polyol or mixture of polyols.

The hydroxyl number is also defined by the following equation which indicates its relationship with the molecular weight and functionality of the polyol:

$$OH = \frac{56.1 \times 1000 \times f}{M.W.}$$

wherein

OH = hydroxyl number of the polyol,
$f$ = average functionality, that is, the average number of hydroxyl groups per molecule of polyol, and
M.W. = average molecular weight of the polyol.

Typical of the polyfunctional organic carboxylic acids that can be employed in producing polyester polyols useful in preparing the foams of this invention are: dicarboxylic aliphatic acids such as succinic, adipic, sebacic, azelaic, glutaric, pimelic, malonic and suberic acids; and dicarboxylic aromatic acids such as phthalic acid, terephthalic acid, isophthalic acid and the like. Other polycarboxylic acids that can be employed are the "dimer acids" such as the dimer of linoleic acid. Hydroxylcontaining monocarboxylic acids (such as ricinoleic acid) can also be used. Alternatively, the anhydrides of any of these various acids can be employed in producing the polyester polyols.

The polyhydric alcohols (organic polyols) that can be employed in producing the polyester polyol starting material used in the process of this invention include the monomeric polyhydric alcohols such as, for example, glycerol; 1,2,6-hexanetriol; ethylene glycol; diethylene glycol; trimethylol propane; trimethyolethane; pentaerythritol; propylene glycol; 1,2-, 1,3- and 1,4-butylene glycols; 1,5-pentanediol; sorbitol; and the like, including mixtures thereof.

Other polyhydric alcohols that can be employed in producing the polyester polyols useful in preparing the foams of this invention are the polymeric polyhydric alcohols which include the linear and branched chain polyethers having a plurality of acyclic ether oxygens and at least two alcoholic hydroxyl radicals. Illustrative of such polyether polyols are the poly(oxyalkylene) polyols containing one or more chains of connected oxyalkylene radicals which are prepared by the reaction of one or more alkylene oxides with acyclic and alicyclic polyols. Examples of the poly(oxyalkylene) polyols include the poly(oxyethylene) glycols prepared by the addition of ethylene oxide to water, ethylene glycol or diethylene glycol; poly(oxypropylene) glycols prepared by the addition of propylene oxide to water, propylene glycol or dipropylene glycol; mixed oxyethylene-oxypropylene polyglycols prepared in a similar manner utilizing a mixture of ethylene oxide and propylene oxide or a sequential addition of ethylene oxide and propylene oxide; and the poly(oxybutylene) glycols and copolymers such as poly(oxyethyleneoxybutylene) glycols and poly(oxypropylene-oxybutylene) glycols. Included in the term "poly(oxybutylene) glycols" are polymers of 1,2-butyleneoxide and 2,3-butyleneoxide.

Illustrative of further polyester polyol reactants that are useful in producing flexible polyester urethane foam in accordance with the process of this invention are the reaction products of any of the aforesaid polycarboxylic acids and the polyhydric alcohols prepared by the reaction of one or more alkylene oxides such as ethylene oxide, propylene oxide, butylene oxide and mixtures thereof, with any of the following: glycerol; trimethylolpropane; 1,2,6-hexanetriol; pentaerythritol; sorbitol; glycosides such as methyl, ethyl, propyl, butyl and 2-ethylhexyl arabinoside, xyloside, fructoside, glucoside, and rhammoside; sucrose; mononuclear polyhydroxybenzenes such as resorcinol, pyrogallol, phloroglucinol, hydroquinone, 4,6-di-tertiarybutylcatechol, and catechol; polynuclear hydroxybenzenes ("polynuclear" designating at least two benzene nuclei) such as the di-, tri- and tetra-phenylol compounds in which two to four hydroxybenzene groups are attached either directly by means of single bonds or through an aliphatic hydrocarbon radical containing 1 to 12 carbon atoms, such compounds being typically illustrated by 2,2-bis(p-hydroxyphenyl)propane, bis(p-hydroxyphenyl)-methane and the various diphenols and diphenol methanes disclosed in U.S. Pat. Nos. 2,506,486 and 2,744,882, respectively. Another type of polyester polyol reactant is that produced by reaction of a polycarboxylic acid and the polyether adducts formed by reaction of ethylene oxide, propylene oxide or butylene oxide with phenol-formaldehyde condensation products such as the novolaks.

The organic polyisocyanates that are useful in producing flexible polyester urethane foam in accordance with the process of this invention are organic compounds that contain at least two isocyanato groups. Such compounds are well known in the art of producing polyurethane foams, and are conveniently represented by the general formula:

$$Q'(NCO)_i$$

wherein: $i$ has an average value of at least 2 and is usually no more than 6, and $Q'$ represents an aliphatic, cycloaliphatic or aromatic radical which can be an unsubstituted hydrocarbyl group or a hydrocarbyl group substituted, for examaple, with halogen or alkoxy. For example, $Q'$ can be an alkylene, cycloalkylene, arylene, alkyl-substituted cycloalkylene, alkarylene or aralkylene radical including corresponding halogen- and alkoxy-substituted radicals. Typical examples of polyisocyanates for use in preparing the polyurethanes of this invention are any of the following including mixtures thereof: 1,6-hexamethylene diisocyanate; 1,4-tetramethylene diisocyanate; 1-methyl-2,4-diisocyanatocyclohexane; bis(4-isocyanatophenyl)methane; 4-methoxy-1,4-phenylenediisocyanate; 4-chloro-1,3-phenylenediisocyanate; 4-bromo-1,3-phenylenediisocyanate; 5,6-dimethyl-1,3-phenylenediisocyanate; 2,4-tolylene diisocyanate; 2,6-tolylene diisocyanate; mixtures of the 2,4- and 2,6-tolylene diisocyanates; crude tolylene diisocyanates; 6-isopropyl-1,3-phenylenediisocyanate; durylene diisocyanate; triphenylmethane-4,4',4''-triisocyanate; and other organic polyisocyanates known to the polyurethane art. Other suitable polyisocyanate reactants are ethylphosphonic diisocyanate and phenylphosphonic diisocyanate. Of the aforesaid types of polyisocyanates, those containing aromatic nuclei are generally preferred.

Also useful as the polyisocyanate reactant are polymeric isocyanates having units of the formula:

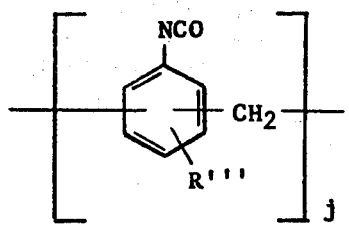

wherein R''' is hydrogen and/or lower alkyl and *j* has an average value of at least 2.1. Preferably the lower alkyl radical is methyl and *j* has an average value of from 2.1 to about 3.2. Particularly useful polyisocyanates of this type are the polyphenylmethylene polyisocyanates produced by phosgenation of the polyamine obtained by acid-catalyzed condensation of aniline with formaldehyde. Polyphenylmethylene polyisocyanates of this type are available commercially under such trade names as PAPI, NIAX Isocyanate AFPI, Mondur MR, Isonate 390P, NCO-120, Thanate P-220, NCO-10 and NCO-20. These products are low viscosity (50–500 centipoises at 25°C.) liquids having average isocyanato functionalities in the range of about 2.25 to about 3.2 or higher, depending upon the specific aniline-to-formaldehyde molar ratio used in the polyamine preparation.

Other useful polyisocyanates are combinations of diisocyanates with polymeric isocyanates containing more than two isocyanate groups per molecule. Illustrative of such combinations are: a mixture of 2,4-tolylene diisocyanate, 2,6-tolylene diisocyanate and the aforesaid polyphenylmethylene polyisocyanates and/or polymeric tolylene diisocyanates obtained as residues from the manufacture of the diisocyanates.

On a combined basis, the polyester polyol and organic polyisocyanate usually constitute the major proportion by weight of the polyurethane-forming reaction mixture. In general, the polyisocyanate and polyester polyol reactants are employed in relative amounts such that the ratio of total —NCO equivalents to total active hydrogen equivalent (of the polyester polyol and any water, when used) is from 0.8 to 1.5, preferably from 0.9 to 1.2, equivalents of —NCO per equivalent of active hydrogen. This ratio is known as the Isocyanate Index and is often also expressed as a percent of the stoichiometric amount of polyisocyanate required to react with total active hydrogen. When expressed as a percent, the Isocyanate Index may be from 80 to 150, and is preferably within the range from about 90 to about 120.

The urethane-forming reaction is effected in the presence of a minor amount of a catalyst comprising an amine. This component of the polyurethane-forming reaction mixture is usually a tertiary amine. Suitable amine catalysts include one or more of the following: N-methylmorpholine; N-ethylmorpholine; N-octadecylmorpholine; triethylamine; tributylamine; trioctylamine; N,N,N',N'-tetramethylethylenediamine; N,N,N',N'-tetramethyl-1,3-butanediamine; triethanolamine; N,N-dimethylethanolamine; triisopropanolamine; N-methyldiethanolamine; hexadecyldimethylamine; N,N-dimethylbenzylamine; trimethylamine; N,N-dimethyl-2-(2-dimethylaminoethoxy)ethylamine, also known as bis(2-dimethylaminoethyl)ether; triethylenediamine (i.e., 1,4-diazabicyclo[2.2.2]octane); the formate and other salts of triethylenediamine, oxyalkylene adducts of the amino groups of primary and secondary amines and other such amine catalysts which are well known in the art of polyurethane manufacture. Also useful are the betatertiary-amino nitriles wherein the 2-cyanoalkyl group is bonded to acyclic tertiary amino nitrogen or to nitrogen of a morpholine or piperazine nucleus. Such catalysts are described in copending application Ser. No. 369,556, filed June 13, 1973 of W. R. Rosemund, M. R. Sandner and D. J. Trecker, and are exemplified by 3-dimethylaminopropionitrile as such or in combination with other tertiary amines such as bis[2-(N,N-dimethylamino)ethyl]ether. Although metal-containing catalysts such as stannous octoate are usually employed in the preparation of flexible polyether urethane foam, such metal catalysts are not preferred in the manufacture of flexible polyester foam.

It is to be understood that the aforesaid amines may be used as essentially the sole amine catalyst of the reaction mixtures employed in this invention or any combination of two or more such amines may be employed. The amine catalyst may also be introduced into the reaction mixture in the form of a solvent solution containing from about 10 to about 80 weight percent of total active catalyst. Suitable carrier solvents of amine catalysts include water-soluble glycols such as diethylene glycol; dipropylene glycol; and 2-methyl-2,4-pentanediol ("hexylene glycol").

The catalyst may also be used in combination with other additives such as any of the non ionic organic surfactants described above in connection with the solution compositions of this invention. Examples of non-ionics which are especially useful as components of the catalyst solutions are the oxyethylated nonylphenol compounds represented by the general formula $C_9H_{19}$—$C_6H_4$—$(OC_2H_4)_k$—OH, wherein $k$ is a number having an average value of from about 9 up to about 20 or more, including average values of $k$ which are either whole or fractional numbers such as 9, 10.5, 15 and the like. When used, the non-ionic organic surfactant may be present in an amount from about 10 to about 80 weight percent, based on the total weight of the catalyst solution. The catalyst solution may also include minor amounts of polysiloxanepolyoxyalkylene block copolymers including the cyano-substituted block copolymers of this invention.

It is to be understood that any of the aforesaid amine catalysts or solutions thereof can be added directly to the foam-producing reaction mixture or they can be added in premixed form with water and the foam stabilizers of this invention. In the latter event, the catalyst is preferably added as a component of the above-described homogeneous aqueous premixtures of this invention.

The amine catalyst is present in the final foam-producing reaction mixture in an amount of from about 0.2 to about 8 parts by weight of active catalyst (that is, the amine exclusive of other components present in solutions thereof) per 100 parts by weight of the polyester polyol reactant.

Foaming can be accomplished by employing a minor amount of a polyurethane blowing agent such as water, in the reaction mixture, the reaction of water and isocyanate generating carbon dioxide blowing agent, or through the use of blowing agents which are vaporized by the exotherm of the reaction, or by a combination of the two methods. These various methods are known in the art. Thus, in addition to or in place of water, other blowing agents which can be employed in the process of this invention include methylene chloride, liquified gases which have boiling points below 80°F. and above —60°F., or other inert gases such as nitrogen, carbon dioxide added as such, methane, helium and argon. Suitable liquefied gases inclue aliphatic and cycloaliphatic fluorocarbons which vaporize at or below the temperature of the foaming mass. Such gases are at least partially fluorinated and may also be otherwise halogenated. Fluorocarbon blowing agents suitable for use in foaming the formulations of this invention include trichloromonofluoromethane, dichlorodifluoromethane, 1,1-dichloro-1-fluoroethane, 1,1,1-trifluoro-2-fluoro-3,3-difluoro-4,4,4-trifluorobutane, hexafluorocyclobutene and octafluorocyclobutane. Another useful class of blowing agents include thermally-unstable compounds which liberate gases upon heating, such as N,N'-dimethyl-N,N'-dinitrosoterephthalamide, and the like. The generally preferred method of foaming for producing flexible foams is the use of water or a combination of water plus a fluorocarbon blowing agent such as trichloromonofluoromethane.

The amount of blowing agent employed in the foaming reaction will vary with factors such as the density that is desired in the foamed product. Usually, however, from about 1 to about 30 parts by weight of the blowing agent per 100 parts by weight of the polyester polyol starting material is preferred.

The organic flame retardants that can be employed in producing flame-retarded flexible polyester foams in accordance with the teachings of this invention can be chemically combined in one or more of the other materials used (e.g., in the polyol or polyisocyanate), or they can be use as discrete chemical compounds added as such to the foam formulation. The organic flame-retardants preferably contain phosphorus or halogen, or both phosphorus and halogen. Usually, the halogen, when present, is chlorine and/or bromine. Flame-retardants of the discrete chemical variety include: 2,2-bis(bromoethyl)-1,3-propanediol; 2,3-dibromopropanol; tetrabromophthalic anhydride; brominated phthalate ester diols such as those produced from tetrabromophthalic anhydride, propylene oxide and propylene glycol; tetrabromobisphenol-A; 2,4,6-tribromophenol; pentabromophenol; brominated anilines and dianilines; bis(2,3-dibromopropyl)ether of sorbitol; tetrachlorophthalic anhydride; chlorendic acid; chlorendic anhydride; diallyl chlorendate; chlorinated maleic anhydride; tris(2-chloroethyl)phosphate [(ClCH$_2$CH$_2$O)$_3$P(O)]; tris(2,3-dibromopropyl)phosphate; tris(1,3-dichloropropyl)phosphate; tris(1-bromo-3-chloroisopropyl)phosphate; tris(1,3-dichloroisopropyl)phosphate; bis(2,3-dibromopropyl) phosphoric acid or salts thereof; oxypropylated phosphoric and polyphosphoric acids; polyol phosphites such as tris(dipropylene glycol)phosphite; polyol phosphonates such as bis(dipropylene glycol)hydroxymethyl phosphonate; di-poly(oxyethylene)hydroxymethyl phosphonate; di-poly(oxypropylene)phenyl phosphonate; di-poly(oxypropylene)chloromethyl phosphonate; di-poly(oxypropylene)butyl phosphonate and O,O-diethyl-N,N-bis(2-hydroxyethyl)aminomethyl phosphate. Also suitable are compounds having the formulas:

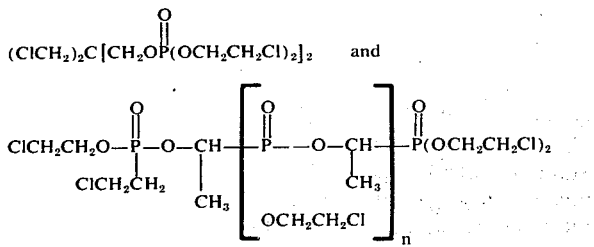

which are available from Monsanto Chemical Company under the names Phosgard 2XC-20 and Phosgard C-22-R, respectively. Other suitable flame-retardants comprise halogen-containing polymeric resins such as polyvinylchloride resins in combination with antimony trioxide and/or other inorganic metal oxides such as zinc oxide, as described in U.S. Pat. Nos. 3,075,927; 3,075,928; 3,222,305; and 3,574,149. It is to be understood that other flame-retardants known to the art may be used and that the aforesaid compounds may be employed individually or in combination with one another.

The flame-retarding agent can be present in the foam formulations described herein in an amount from about 1 to about 30 parts by weight per 100 parts by weight of the polyester polyol reactant, the particular amount employed depending largely on the efficiency of any given agent in reducing flammability.

Those of the above flame-retardants of the discrete chemical compound variety which contain groups reactive with hydroxy or isocyanato groups can be used as reactants in producing the polyester polyols or can be reacted with organic polyisocyanates to produce modified polyols or polyisocyanates having chemically combined flame-retardant groups. Such modified polyester and polyisocyanates are useful as reactants in the process of this invention. In such cases, due regard must be given to the possible effect of the functionality of the compound on the other properties (e.g., degree of flexibility) of the resulting foam.

If desired, other additional ingredients can be employed in minor amounts in producing the polyurethane foams in accordance with the process of this invention. Illustrative of such additives that can be employed are: compression set additives (e.g., hexylene glycol); additives to regulate cell structure so as to coarsen cells and thereby reduce the tendency of the foam to split (e.g., paraffin oil); fillers; dyes; pigments; anti-discoloration additives including antiscorch and anti-oxidation agents; and the like.

With respect to the aforementioned anti-discoloration additives it is noted that, in the commercial manufacture of polyurethane slabstock, discoloration due to scorching may be observed in or toward the center sections of the bun where the heat due to the exotherm of the polyurethane-forming reaction is more intense and held longer. The discoloration becomes more evident as the size of the foam bun increases and is especially noticeable when the bun is cut into relatively thin sections as in the application of polyester polyol-derived foam as a textile interliner. In general, such discoloration is inhibited by the addition to the foam formulation of minor amounts of various anti-scorch additives such as: phenols substituted with tertiarybutyl groups such as 2,6-di-tert-butyl-4-methylphenol ("Ionol"), and 2,4,6-tri-tert- butyl-phenol; tert-butyl-catechol; p-methoxyphenol; phenothiazine; oxirane-containing compounds such as, in particular, propylene oxide; triorganosubstituted phosphites and phosphines such as, for example, triphenylphosphite and triphenylphosphine; and other known anti-scorch or anti-oxidizing agents including any combination of the aforesaid compounds. When used, such additives are present in the foam formulation in an amount between about 0.0005 to about 1 part by weight, per 100 parts by weight of polyol reactant.

The process described herein for the production of flexible polyester urethane foam is usually carried out as a one-shot process in which the polyester polyol and polyisocyanate reactants are independently added to the foam-producing reaction mixture. The foaming and urethaneforming reactions occur without the applications of external heat. Often the resulting foam is cured by heating the foam at a temperature between about 100°C. and about 150°C. for about 10 to about 60 minutes to eliminate any surface tackiness, as desired. It is to be understood that variations in process conditions and manipulative steps can be used as known in the art. For example, the various ingredients of the reaction mixture can be combined and the foaming reaction mixture poured into a mold, or the various ingredients can be combined and the foaming reaction mixture commenced and completed in a mold.

The relative amounts of the various components reacted in accordance with the above-described process for producing flexible polyester urethane foams are not narrowly critical. The polyester polyol and polyisocyanate are present in the foam-producing formulation in a major amount. The relative amounts of these two components is the amount required to produce the urethane structure of the foam and such relative amounts are well known in the art. The source of the blowing action such as water, auxiliary blowing agents, amine catalyst and the organosilicone polymeric foam stabilizers are each present in a minor amount necessary to achieve the function of the component. Thus, the blowing agent is present in a minor amount sufficient to foam the reaction mixture, the amine catalyst is present in a catalytic amount (i.e., an amount sufficient to catalyze the reaction to produce the urethane at a reasonable rate), and the organosilicone polymers of this invention are present in a foam-stabilizing amount, that is, in an amount sufficient to stabilize the foam. The preferred amounts of these various components are as given hereinabove.

The flexible polyester urethane foams produced in accordance with this invention can be used in the same areas as conventional flexible polyester urethane foams. For example, they can be used as textile interliners, cushioning materials for seating, for packaging of delicate objects, and as gasketing materials.

The following examples are merely illustrative of the present invention and are not intended as a limitation upon the scope thereof.

Molecular weights given in the examples for various polymer compositions of this invention, were measured by Gel Permeation Chromatography (abbreviated in the examples as "GPC") using a calibration curve showing the relationship between the respective elution volumes established for dimethylsiloxane fluids of different molecular weights and the respective known molecular weights of such fluids. In establishing the calibration curve, the various dimethylsiloxane fluids were in solution in trichloroethylene solvent using styragel packed columns. In measuring the molecular weights of the polymers described herein, the elution volume observed for any particular polymer product (in trichloroethylene solvent) was equated with the corresponding elution volume of the calibration curve, and the molecular weight associated with that particular elution volume was assigned as the molecular weight of the polymer product. Gel Permeation Chromatography as a technique for measuring molecular weight is discussed in "Polymer Fractionation" (ed. Manfred J. R. Cantow, Academic Press, Inc. New York 1967), pages 123–173, Chapter B4, entitled "Gel Permeation Chromatography," by K. H. Altgelt and J. C. Moore. In determining the molecular weights given in the examples, the particular procedure employed was that described in the article entitled "Characterization of Silicones by Gel Permeation Chromatography" by F. Rodriguez et al. in *I and EC Product and Development*, Vol. 5, No. 2, page 121 (June 1966) using five styragel packed columns (Waters Associates, Inc.) having a pore size of $10^3$A, $3 \times 10^3$A, $10^4$A, $3 \times 10^4$A, and $8 \times 10^3$A, respectively.

It is to be understood that in the formulas included in the data which follows, "Me" designates a methyl group, —$CH_3$.

EXAMPLES 1–6

In accordance with these examples, novel 3-cyanopropyl-substituted polymethylpolysiloxane hydride fluids, designated in the examples as Si—H Fluids I–VI were prepared having the average composition:

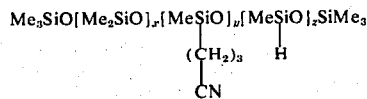

wherein the particular average values of $x$, $y$ and $z$ are given in Table I below. The respective fluids were prepared by the acid-catalyzed equilibration of reactants (1)–(4) listed below employing trifluoromethylsulfonic acid or concentrated sulfuric acid as the catalyst.

Reactant (1): Hexamethyldisiloxane, $Me_3SiOSiMe_3$, as the source of the endblocking trimethylsiloxy units, $Me_3SiO_{1/2}$—.

Reactant (2): Cyclic polymers of dimethylsiloxane distilled to provide the cyclic tetramer, $[Me_2SiO]_4$, as the predominant component (boiling point, 175°C./760 mm. Hg), as the source of the dimethylsiloxy units.

Reactant (3): Cyclic 3-cyanopropylmethylsiloxane polymer, as the source of the 3-cyanopropylmethylsiloxy units. This reactant is prepared by the hydrolysis of 3-cyanopropylmethyldichlorosilane, $MeSiCl_2(CH_2)_3CN$, at a temperature of about 10°–15°C. and subatmospheric pressure (40–110 mm.) employing toluene diluent and neutralizing the hydrolyzate with sodium bicarbonate, followed by dehydration and cyclization of the hydrolyzate in the presence of sodium bicarbonate at reflux temperature, and removal of toluene from the cyclizate.

Reactant (4): Polymeric methylhydrogensiloxane (Si—H analysis, 355–365 cc. $H_2$ per gram), as the source of the methylhydrogensiloxy units.

The respective amounts of the aforesaid reactants (1)–(4) and catalyst employed in providing and analytical data pertaining to the respective reaction products are given in Table I; the procedure and reaction conditions employed are as typically illustrated by the following detailed description of the preparation of Fluid I.

Preparation of Fluid I

The aforesaid Reactants (1)–(4) were charged in the following amounts to a 500 ml. capacity, three-necked flask equipped with a thermometer, mechanical stirrer, condenser and nitrogen blow-by:

Reactant (1): 16.2 grams, corresponding to 0.1 mole of Me$_3$SiOSiMe$_3$ or 0.2 mole-equivalents of Me$_3$SiO$_{1/2}$;
Reactant (2): 44.5 grams, corresponding to 0.6 mole-equivalent (x') of the unit, Me$_2$SiO$_{2/2}$;
Reactant (3): 101.78 grams, corresponding to 0.8 mole-equivalent (y') of the unit, NC(CH$_2$)$_3$Si(-Me)O$_{2/2}$; and
Reactant (4): 36.0 grams, corresponding to 0.6 mole-equivalent (z') of the unit, MeHSiO$_{2/2}$.

Also added was 0.8 gram of anhydrous trifluoromethyl sulfonic acid catalyst corresponding to about 0.4 weight percent of the total weight of reactants. The heterogeneous reaction mixture was stirred at room temperature overnight (about 18 hours). The clear liquid equilibrate was neutralized with sodium bicarbonate while stirring for about 1 hour, and filtered. The liquid product had a viscosity of 116 centipoise. Based upon the method and proportions of reactants employed expressed on the normalized basis of two moles of M units, the fluid product, designated Si-H Fluid I, has the average composition:

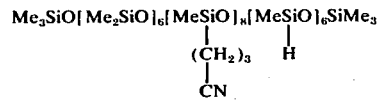

corresponding to a theoretical MeHSiO content of 18.1 weight percent. Upon Si—H analysis, the product provided 64.0 cc. H$_2$/gram on the basis of which the found MeHSiO content is 17.4 weight percent.

As used herein, the weight percentages expressed as "% MeHSiO, Found" are derived from the Si—H analyses (cc. H$_2$ per gram) in accordance with the conversion:

$$\text{Weight Percent MeHSiO Found} = \frac{\text{cc. H}_2 \text{ per gram} \times 100}{373.3}$$

where the factor 373.3 is the theoretical number of cubic centimeters of hydrogen provided per gram of fluid consisting of 100 percent MeHSiO (that is, 22,400 cc. of hydrogen divided by the unit molecular weight of 60). The weight percentages expressed as "% MeHSiO, Theoretical" correspond to the weight (60 z) contributed by MeHSiO divided by the calculated molecular weight of the fluid product times 100.

The above data pertaining to Si—H Fluid I, as well as corresponding data for Si—H Fluids II–VI are given in Table I which follows.

TABLE I

Preparation of 3-Cyanopropyl Substituted Si—H Fluids Having the Average Composition, Me$_3$SiO[Me$_2$SiO]$_x$[MeSiO]$_y$[MeSiO]$_z$SiMe$_3$, where the average values of x, y and z are given below.
                 (CH$_2$)$_3$CN   H

| EXAMPLE NO. | 1 | 2 | 3 | 4 | 5 | 6 |
|---|---|---|---|---|---|---|
| Si—H Fluid Designation | I | II | III | IV | V | VI |
| REACTANTS | | | | | | |
| Me$_3$SiOSiMe$_3$: grams | 16.2 | 16.2 | 16.2 | 16.2 | 16.2 | 16.2 |
| moles /1/ | 0.1 | 0.1 | 0.1 | 0.1 | 0.1 | 0.1 |
| Me$_2$SiO$_{2/2}$: grams /2/ | 44.5 | 44.5 | 59.2 | 37.0 | 37.0 | 44.5 |
| mole-eq. (x') | 0.6 | 0.6 | 0.8 | 0.5 | 0.5 | 0.6 |
| NC(CH$_2$)$_3$Si(Me)O$_{2/2}$: grams /3/ | 101.7 | 50.9 | 63.6 | 63.6 | 63.6 | 50.9 |
| mole-eq. (y') | 0.8 | 0.4 | 0.5 | 0.5 | 0.5 | 0.4 |
| Me(H)SiO$_{2/2}$: grams /4/ | 36 | 36 | 42.0 | 42.0 | 48.1 | 36 |
| mole-eq. (z') | 0.6 | 0.6 | 0.7 | 0.7 | 0.8 | 0.6 |
| CATALYST | | | | | | |
| CF$_3$SO$_3$H, wt. % | 0.4 | 0.8 | — | — | — | — |
| Conc. H$_2$SO$_4$, wt. % | — | — | 1.2 | 1.2 | 1.2 | 1.2 |
| Si—H Fluid Product | | | | | | |
| Moles of Units/2Me$_3$SiO$_{1/2}$ | | | | | | |
| x (average) | 6 | 6 | 8 | 5 | 5 | 6 |
| y (average) | 8 | 4 | 5 | 5 | 5 | 4 |
| z (average) | 6 | 6 | 7 | 7 | 8 | 6 |
| Si—H Analysis | | | | | | |
| cc. H$_2$/gram | 64.0 | 84.0 | 84.2 | 96.3 | 109 | 90.7 |
| % Me(H)SiO : Found /5/ | 17.4 | 22.5 | 22.6 | 25.8 | 29.2 | 24.3 |
| Theo. | 18.1 | 24.4 | 23.2 | 26.5 | 29.1 | 24.4 |
| Viscosity, centipoise | 116 | 36 | 42.5 | 40 | 37.5 | 32.5 |

/1/ Corresponding to 0.2 moles (or mole-equivalents) of Me$_3$SiO$_{1/2}$.
/2/ Grams used of Reactant (2), corresponding to the indicated mole-equivalents of the unit, Me$_2$SiO$_{2/2}$.
/3/ Grams used of Reactant (3), corresponding to the indicated mole-equivalents of the unit, NC(CH$_2$)$_3$Si(Me)O$_{2/2}$.
/4/ Grams used of Reactant (4), corresponding to the indicated mole-equivalents of the unit, Me(H)SiO$_{2/2}$.
/5/ Corresponding to the cc. H$_2$/gram found.

In accordance with the following Examples 7–12, cyano-substituted siloxane-polyoxyethylene copolymers were prepared by the platinum-catalyzed hydrosilation of organic-capped, allyl-started polyoxyethylene ethers with the cyano-substituted polymethylsiloxane hydrides identified in Table I, namely, Si—H Fluids I–VI. In describing the preparation of the copolymers, the indicated mole-equivalents of MeHSiO corresponding to the amount of Si—H fluid reactant employed are based on the "% MeHSiO, Found" values of the fluids given in Table I. The polyether reactants employed contain a small percentage (up to about 15 mole percent) of hydroxyl-terminated polyether chains due to incomplete capping of the allyl-started polyether intermediate. These reactants are therefore predominantly capped polyethers having the following average compositions:

Polyether A: MeO(C$_2$H$_4$O)$_b$CH$_2$CH=CH$_2$
Polyether B: C$_6$H$_5$CH$_2$O(C$_2$H$_4$O)$_b$CH$_2$CH=CH$_2$
where the average value of b is about 7.8. For the purpose of calculating the stoichiometric amount of polyether reactant, the formula weight of Polyether A is taken are 415 and that of Polyether B is taken as 490.

EXAMPLE 7

Preparation of Surfactant A

A mixture was prepared containing: Si—H Fluid I in an amount of 39.7 grams (about 0.12 mole-equivalent MeHSiO); Polyether A in an amount of about 64.7 grams (0.156 mole) which includes about a 30 weight percent excess over the stoichiometric amount of polyether reactant required to react completely with the Si—H groups of Fluid I; and 100 ml. of toluene solvent. The mixture was heated rapidly to 85°C. with stirring and while at that temperature 50 p.p.m. of Pt catalyst as chloroplatinic acid was added thereto. The exothermic nature of the reaction increased the temperature to 103°C. The reaction mixture was maintained at 80°C. for 3 hours and was then cooled to room temperature over a period of 1 hour. A standard Si—H test (KOH-ethanol technique) indicated the presence of 1 cc. $H_2/2$ ml. sample. The reaction product was then neutralized with sodium bicarbonate, filtered and desolvated by rotary vacuum stripping at 55°C./5 mm. The product (93.4 grams) was a clear liquid having a Brookfield viscosity (at 25°C.) of 100 centipoise, and a molecular weight (G.P.C.) of 5400 ($\overline{M}_N$). The product of this example has the average composition,

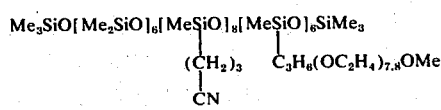

and is designated herein as Surfactant A.

EXAMPLE 8

Preparation of Surfactant B

A mixture was prepared containing: Si—H Fluid II (29.5 grams; 0.11 mole-equivalent MeHSiO); 76.4 grams of Polyether B corresponding to about 42 weight percent in excess of stoichiometry; and toluene (100 ml). After heating to 85°C., 50 p.p.m. Pt catalyst was added as chloroplatinic acid. The exotherm brought the temperature to 100°C. after which the mixture was maintained at 85°C. for 1 hour and was then stirred for several days at room temperature. The product was then neutralized with sodium bicarbonate, filtered and toluene removed. The liquid product had a viscosity of 123 centipoise and a molecular weight (G.P.C.) of 2500 ($\overline{M}_N$). The copolymer of this example has the average composition,

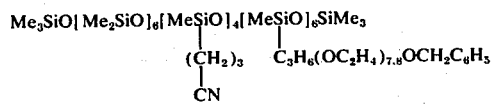

and is designated herein as Surfactant B.

EXAMPLE 9

Preparation of Surfactant C

A mixture was prepared containing: Si—H Fluid III in an amount of 33.7 grams (about 0.13 mole-equivalent MeHSiO); Polyether A in an amount of about 68 grams which includes about a 25 weight percent excess over the stoichiometric amount required to react completely with the Si—H content of Fluid III; and 100 ml. of toluene solvent. The mixture was heated to 90°C. with stirring and while at that temperature 50 p.p.m. of Pt catalyst as chloroplatinic acid was added thereto. Upon catalyst addition, the temperature rose to 108°C. The reaction mixture was then heated at 110°C. for 1 hour after which the standard test for Si—H indicated 0.7 cc. $H_2$ per 2 ml. sample as residual Si—H. The reaction mixture was then cooled to room temperature, neutralized with sodium bicarbonate by stirring for 1 hour at room temperature, the slurry also containing filter aids (attacote and Hyflo Super-Cel). The slurry was then filtered and desolvated by rotary vacuum stripping. The product was a clear liquid having a Brookfield viscosity (at 25°C.) of 159 centipoise and an average molecular weight (G.P.C.) of 4600. Based upon the relative proportions of reactants employed, the product has the average composition:

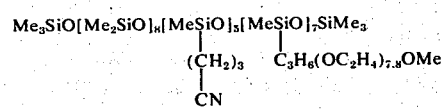

and is designated herein as Surfactant C.

EXAMPLE 10

Preparation of Surfactant D

The copolymer of this example was prepared employing: Si—H Fluid IV in an amount of 31.8 grams (about 0.14 mole-equivalent MeHSiO); Polyether A in an amount of 73.2 grams which includes about a 25 weight percent excess over the stoichiometric amount required to react completely with the Si—H content of Fluid IV; and 45 grams of toluene. The initial reaction was carried out in the presence of 50 p.p.m. Pt catalyst under the conditions described under Example 9 except that additional catalyst was added and the reaction mixture was further heated at 100°C. for 2 hours, after which residual Si—H was reduced to 1.0 cc. $H_2/2$ ml. sample. The reaction mixture was neutralized, filtered and desolvated as described under Example 9. The liquid product had a Brookfield viscosity (at 25°C.) of 173 centipoise and an average molecular weight (G.P.C.) of 4400. Based upon the relative proportions of reactants employed, the copolymer product has the average composition,

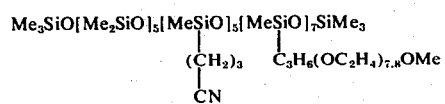

and is designated herein as Surfactant D.

EXAMPLE 11

Preparation of Surfactant E

Following substantially the same procedure described under Example 9, the copolymer of this example was prepared employing: Si—H Fluid V in an amount of 31.0 grams (about 0.15 mole-equivalent of MeHSiO); Polyether A in an amount of 78.3 grams which includes about a 25 weight percent excess over the stoichiometric amount required to react completely with Si—H of Fluid V; toluene solvent (47.7 grams); and 50 p.p.m. Pt catalyst. The residual Si—H content of the copolymer product was 0.6 cc. $H_2$ per 2 ml. sample. The liquid product had a Brookfield viscosity (at 25°C.) of 150 centipoise and an average molecular weight (G.P.C.) of 4400. The product has the average composition,

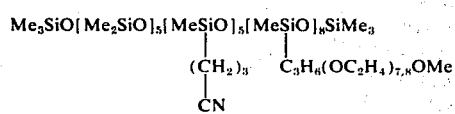

and is designated herein as Surfactant E.

EXAMPLE 12

Preparation of Surfactant F

Following substantially the same procedure described under Example 9, the copolymer of this example was prepared employing: Si—H Fluid VI in an amount of 34.4 grams (about 0.14 mole-equivalent of MeHSiO); Polyether A in an amount of 73.2 grams which includes about a 25 weight percent excess over the stoichiometric amount required to react completely with Si—H of Fluid VI; toluene solvent (46.4 grams); and 50 p.p.m. Pt catalyst. The residual Si—H content of the copolymer product was 0.8 cc. $H_2$ per 2 ml. sample. The liquid product had a Brookfield viscosity (at 25°C.) of 112 centipoise and an average molecular weight (G.P.C.) of 4000. The product has the average composition,

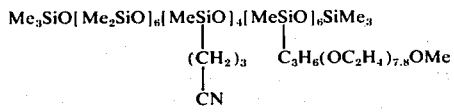

and is designated herein as Surfactant F.

EXAMPLES 13–18

In accordance with these examples, flame-retarded, flexible polyester polyurethane foams were produced using the above-described Surfactants A through F of the present invention as the respective foam stabilizing surfactant component of the foam-producing reaction mixture, designated herein as Foam Formulation A, which had the composition given in Table II which follows.

TABLE II

| FOAM FORMULATION A | |
|---|---|
| Component | Parts By Weight |
| Surfactant | 0.35 |
| Polyester Polyol /1/ | 100.0 |
| N-ethylmorpholine | 1.9 |
| Hexadecyldimethylamine | 0.3 |
| Water | 3.6 |
| Tolylene diisocyanate (Index 105) /2/ | 45.2 |
| Tris(2-chloroethyl)phosphate | 7.0 |

/1/ The polyester polyol employed was a commercially available polyester resin produced from adipic acid, diethylene glycol and trimethylol propane in a mole ratio of approximately 1:1:0.2. This polyester has a hydroxyl number of about 50 to 56, a molecular weight of about 2,000, an acid number not greater than 2 and a viscosity of about 17,000 centistokes at about 25°C. This particular polyester is sold under the name "Witco Fomrez No. 50".

/2/ This component was a mixture of 2,4-tolylene diisocyanate (80 weight percent) and 2,6-tolylene diisocyanate. Index 105 means that the amount of mixture employed was 105 percent of the stoichiometric amount required to react with the polyester polyol and water present in the foam formulation.

The runs of Examples 13–18 were carried out in accordance with substantially the same general procedure which entailed the following steps. The surfactant, amine catalysts and water were premixed in a 50 milliliter beaker. The polyester polyol reactant was weighed into a tared 32-ounce capacity container. The flame-retardant [tris(2-chloroethyl)phosphate] and tolylene diisocyanate reactant were also weighed into the container and mixed with a spatula until homogeneous. Further mixing was done on a drill press equipped with a double three-bladed marine-type propellor about 3 inches in diameter. The mixing in the drill press was accomplished at 1000 revolutions per minute for 8 seconds. Then the premixture of surfactant, catalyst and water was added and mixing was continued for 7 additional seconds. The reaction mixture was poured into a 12 in. × 12 in. × 12 in. cardboard box, was allowed to rise and was then cured for about 30 minutes at 130°C. Samples were prepared for breathability measurements and for a determination of burning resistance (burning extent and flame rating) in accordance with ASTM D-1692-68.

As used in the examples, the following terms have the indicated significance:

"Rise" denotes the foam height and is directly proportional to potency of the surfactant.

"Breathability" denotes the porosity of a foam, being roughly proportional to the number of open cells in a foam, and was measured in accordance with the NOPCO breathability test procedure described by R. E. Jones and G. Fesman, Journal of Cellular Plastics, January, 1965. In accordance with this test, breathability is measured as follows: A 2 inch × 2 inch × 1 inch piece of foam is cut from near the center of the bun. Using a Nopco Foam Breathability Tester, Type G. P.-2 Model 40 G. D. 10, air is drawn through the 1 inch portion at a pressure differential of 0.5 inches of water less than atmospheric pressure. The air flow is parallel to direction of original foam rise. The degree of openness of the foam (or foam breathability) is measured by air flow and is expressed as standard cubic feet per minute (SCFM)

"CPI" denotes "cells per inch," that is, the number of cells per linear inch of the foam. CPI is directly proportional to the fineness of the cell structure.

"Burning Extent" denotes the burned length in inches of a test specimen of foam as measured in accordance with standard flammability test procedure ASTM D-1692-68.

"SE" indicates that, on the basis of the aforesaid flammability test, the burning extent of the foam sample was less than 5.0 inches, thereby qualifying the foam for a self-extinguishing (SE) rating.

"B" denotes that, on the basis of the aforesaid flammability test, the burning extent of the foam sample was 5.0 inches or greater and thus did not qualify as a self-extinguishing material; therefore, the foam is assigned a burning (B) rating.

The results of Examples 13–18 are given in Table III which follows.

TABLE III

STABILIZATION OF FLAME-RETARDED FOAM USING SURFACTANTS A–F HAVING THE AVERAGE COMPOSITION,
$Me_3SiO[Me_2SiO]_x[MeSiO]_y[MeSiO]_zSiMe_3$, where E is $—C_3H_6(OC_2H_4)_{7.6}OMe$ (Surfactants A and (C–F)

$$\begin{array}{c} | \\ (CH_2)_3 \quad E \\ | \\ CN \end{array}$$

or $—C_3H_6(OC_2H_4)_{7.6}OCH_2C_6H_5$ (Surfactant B), and the average values of x, y and z are given below.

| | | SURFACTANT | | | | | | FOAM QUALITY | | | | FLAMMABILITY | |
|---|---|---|---|---|---|---|---|---|---|---|---|---|---|
| Ex. | | x | y | z | x+y:z | Polyether Wt. % | Siloxane Wt. % | Rise (inches) | Breath-ability (SCFM) | CPI | Density (pcf) | Rating | Burning Extent (inches) | Burning Time (seconds) |
| 13 | A | 6 | 8 | 6 | 2.3 | 56 | 44 | 5.3 | 2.1 | 40–45 | 2.5 | SE | 2.7 | 51 |
| 14 | B | 6 | 4 | 6 | 1.7 | 67 | 33 | 5.4 | 2.0 | 45–50 | 2.0 | SE | 2.6 | 37 |
| 15 | C | 8 | 5 | 7 | 1.9 | 62 | 38 | 5.0 | 3.9 | 50–55 | 2.1 | SE | 2.3 | 51 |
| 16 | D | 5 | 5 | 7 | 1.4 | 65 | 35 | 5.5 | 1.9 | 50–55 | 2.11 | SE | 1.6 | 32 |
| 17 | E | 5 | 5 | 8 | 1.3 | 67 | 33 | 5.6 | 2.3 | 45–50 | 2.01 | SE | 0.9 | 24 |
| 18 | F | 6 | 4 | 6 | 1.7 | 63 | 37 | 5.3 | 3.9 | 40–45 | 1.98 | SE | 1.8 | 47 |

The data of Table III demonstrate that the cyanopropyl-polymethylsiloxane-polyoxyethylene copolymers encompassed by the present invention are effective stabilizers of flame-retarded, flexible polyester foam and possess the further desirable property of allowing for the formation of self-extinguishing flame-retarded foam of low burning extent.

EXAMPLES 19–24

In these examples, a potency determination was made of surfactants of this invention using a foam formulation, designated as Foam Formulation B, which contained 5 parts by weight of water per 100 parts by weight of polyester polyol reactant. The 5 parts water system is usually more difficult to stabilize than the more conventional formulations containing less water and thus provides a relatively sensitive test of potency. The composition of Foam Formulation B is as follows:

TABLE IV

| FOAM FORMULATION B | |
|---|---|
| Component | Parts By Weight |
| Surfactant | 0.35 |
| Polyester polyol /1/ | 100.0 |
| N-ethylmorpholine | 1.9 |
| Hexadecyldimethylamine | 0.3 |
| Water | 5.0 |
| Tolylene diisocyanate (Index 105) /2/ | 59.4 |

/1/ The polyol employed was the same as that of Foam Formulation A and is identified in footnote /1/ of Table II.
/2/ The isocyanate employed was the same as that of Foam Formulation A and is identified in footnote /2/ of Table II.

The results of these examples are given in Table V which follows.

TABLE V

| Example | 19 | 20 | 21 | 22 | 23 | 24 |
|---|---|---|---|---|---|---|
| Surfactant | A | B | C | D | E | F |
| Rise | | | | | | |
| Inches | 8.4 | 8.1 | 8.7 | 8.8 | 9.1 | 8.8 |
| Breathability | | | | | | |
| SCFM | 0.98 | 0.6 | 1.9 | 1.3 | 1.2 | 1.9 |
| Density | | | | | | |
| PCF | 1.40 | 1.54 | 1.41 | 1.34 | 1.39 | 1.40 |
| CPI | 7–10 | 35–40 | 15–20 | 20–25 | 15–20 | 20–25 |

The data of Table V demonstrate that the surfactants of this invention have excellent potency as reflected by the rise values and that the non-flame-retarded flexible polyester foam products are also of good quality.

EXAMPLE 25

Preparation of Surfactant G

A further novel cyanopropyl-substituted polymethylsiloxane hydride of the invention was prepared by the acid-catalyzed equilibration of the following reactants (expressed on a parts by weight basis): 39 parts of hexamethyldisiloxane (about 92 weight percent active); 54 parts of cyclic polymers of dimethylsiloxane predominating in the cyclic tetramer; 120 parts of cyclic 3-cyanopropyl-methylsiloxane polymer predominating in the cyclic tetramer $[CNC_3H_6Si(Me)O]_4$; and 90 parts of polymethylhydrogensiloxane, $[Me(H)SiO]_n$. The equilibration was effected with stirring for 24 hours at ambient temperature employing concentrated (98 weight percent) sulfuric acid as the catalyst in an amount (3.3 parts) corresponding to about 1.1 weight percent, based on the total weight of the aforesaid reactants. The equilibrated reaction product was neutralized by stirring four hours with 25 parts of sodium bicarbonate, followed by filtration. The product, designated Si—H Fluid VII, had a viscosity of 27.6 centistokes. Based on the relative proportions of reactants employed, the content of MeHSiO is about 30 weight percent. The average composition of the equilibrated product is,

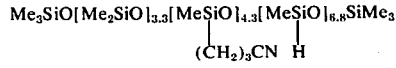

This fluid (100 parts) was combined with a methyl-capped, allyl-started polyoxyethylene ether (270 parts) having the average composition, $MeO(C_2H_4O)_8CH_2CH=CH_2$, and toluene solvent (about 30 weight percent, based on the combined weight of the Si—H and polyether reactants). The mixture was heated to 85°C. under nitrogen and while at 85°C., platinum catalyst was added (90 p.p.m. Pt added as chloroplatinic acid). The hydrosilation reaction was complete within 6 hours. The product was treated with sodium bicarbonate (1 part) and, after filtration, toluene was removed by stripping at 30°C. with a 30 percent nitrogen sparge. The viscosity of the stripped product was 109 centipoise. The copolymer of this example has the average composition,

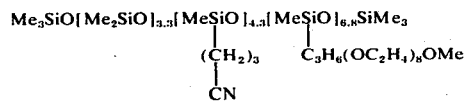

and is designated herein as Surfactant G. In this copolymer, the mole ratio of $x+y:z$ is about 1.1:1 and the polyether and siloxane contents are about 68 and 32 weight percent, respectively.

Comparative Copolymer I

For the purpose of comparison, a cyanopropyl-substituted polymethylsiloxane-polyoxyalkylene copolymer which is not of the present invention was prepared as follows: In a 500 ml. three-necked flask, equipped with a thermometer, mechanical stirrer, condenser, and nitrogen blow-by, were charged: 16.2 grams (0.1 mole) of hexamethyl-disiloxane; 16.8 grams of cyclic [Me$_2$SiO] polymers predominating in the tetramer, corresponding to 0.22 mole-equivalents of Me$_2$SiO; 25.5 grams of cyclic gamma-cyanopropyl methyl dimethylsiloxane, corresponding to 0.1 mole of [Me$_2$SiO]$_{1.73}$[NC(CH$_2$)$_3$SiMeO]; and 6.0 grams of polymeric methylhydrogensiloxane fluid, corresponding to 0.1 mole of MeHSiO. The mixture was stirred at room temperature while concentrated sulfuric acid (1.1 gram) was added to the system. Equilibration time at 25°C. was 24 hours. The mixture was neutralized by stirring 4 hours with sodium bicarbonate (20 grams), followed by filtration. The equilibrated product has the following average composition,

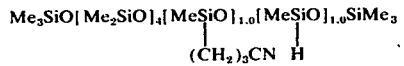

This product in an amount of 64.5 grams (0.1 mole-equivalent MeHSiO) was combined with toluene (50 ml.) and a polyether having the average composition, MeO(c$_2$H$_4$O)$_8$CH$_2$CH=CH$_2$, in an amount of 54.3 grams (0.13 mole allyl). The mixture was heated to 65°C. with stirring under nitrogen atmosphere. The reaction was then catalyzed with 50 p.p.m. Pt as chloroplatinic acid and was heated for 1.25 hours at 100°C. The reaction mixture was cooled, treated with 0.5 weight percent sodium bicarbonate, 0.5 weight percent Hyflo Super-Cel and 0.2 weight percent DARCO G-80 (the latter two components being filter aids), followed by pressure filtration and vacuum stripping of solvent. The resulting product was a clear amber liquid and has the average composition,

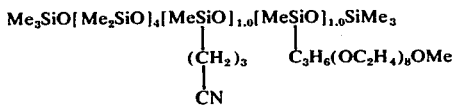

and is referred to herein as Copolymer I. This copolymer contains only 1 mole of cyanopropyl-methylsiloxy per two moles of the endblocking units, and has a total siloxane content of about 60 weight percent and a total polyether content of about 40 weight percent. Therefore, Copolymer I is not within the scope of the copolymers of the invention. Copolymer I, on the other hand, is similar to the following structure disclosed in U.S. Pat. No. 3,234,252 as Copolymer VIII therein:

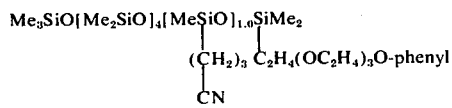

which has a polysiloxane content of about 69 weight percent and a still lower polyether content of only about 31 weight percent. In contrast to the compositions of the present invention, comparative Copolymer I was an ineffective foam stabilizer as shown by data included hereinbelow.

EXAMPLE 26

In accordance with this example, flame-retarded, flexible polyester foam was provided employing Surfactant G as the surfactant component of Foam Formulation A, following the above foam procedure described with specific reference to Examples 13–18. The product was a uniform, fine-celled foam, free of splits with a final rise after cure of 5.8 inches. The foam qualified for a self-extinguishing rating (by ASTM D-1692-68) and had a burning extent of 2.2 inches and a burning time of 46 seconds. In contrast, when comparative Copolymer I was employed as the "surfactant" component of Foam Formulation A and the same procedure was followed, the foam produced underwent total collapse with a final rise after cure of less than 1.0 inch, thereby indicating its ineffectiveness as a stabilizer of flexible polyester foam.

In the following Examples 27 to 39, illustrative solution compositions comprising the cyano-substituted siloxane-polyoxyalkylene copolymers of the present invention were used as the foam stabilizing components of polyester polyol-based urethane formulations. These solution compositions, which are designated in the examples as Blended Surfactants H and J through O, contained as the copolymer component above-described Surfactants D, E, F and G. The composition of each of the blended surfactants is given in Table VI. As controls, two excellent stabilizers of polyester polyol-based formulations were used and are designated in the data as Blended Surfactants AA and BB. The silicon-containing surfactant of Blended Surfactant AA is a siloxane-polyoxyalkylene block copolymer (No. II) in which the siloxane backbone is substituted only with methyl groups. Blended Surfactant AA is of the type described in U.s. Pat. No. 3,594,334 and its average composition is also given in Table VI. The silicon-containing component (No. III) of control Blended Surfactant BB is of the type described in U.S. Pat. Nos. 3,793,360 and 3,793,300 and contains monofunctional chain-terminating units, Me$_3$SiO$_{1/2}$, in combination with difunctional polyoxyalkylene-methylsiloxy units and inorganic tetrafunctional units, SiO$_{4/2}$. The average composition of Blended Surfactant BB is also given in Table VI which follows.

TABLE VI

| Blended Surfactant | Si-Surfactant | COMPONENTS (Parts By Weight) /6/ Organic Surfactant Type | | Tall Oil | Hexylene Glycol |
| --- | --- | --- | --- | --- | --- |
| H | E | 35 | Anionic /1/ | 35 | 15 | 15 |
| J | D | 35 | Anionic /1/ | 35 | 15 | 15 |
| K | D | 52 | Non Ionic /2/ | 15.6 | 10.4 | 21 |
| L | F | 35 | Anionic /1/ | 35 | 15 | 15 |
| M | F | 52 | Non Ionic /2/ | 15.6 | 10.4 | 21 |
| N | G | 35 | Anionic /3/ | 35 | 15 | 15 |
| O | G | 52 | Non Ionic /2/ | 10.4 | 15.6 | 21 |
| Controls (Not Compositions of the Invention) | | | | | | |
| AA | II /4/ | 35 | Anionic /1/ | 35 | 15 | 15 |
| BB | III /5/ | 52 | Non Ionic /2/ | 10.4 | 15.6 | 21.0 |

/1/ Sodium sulfonate of a hydrocarbon mixture a typical analysis of which is (weight percent): 62.0 sodium sulfonate; 32.7 mineral oil; 4.5 water; 0.7 inorganic salt; average molecular weight of sulfonate portion is 435; flash point, C.O.C. 400°F.; available commercially as "Bryton 430."

/2/ The hydrophobe is a mixture of $C_{11-15}$ alcohols and the hydrophile is ethylene oxide (avc. 9 mols/mol of hydrophobe).

/3/ Sodium sulfonate of hydrocarbon mixture, available commercially as "Petronate L" (Witco Chemical Company).

/4/ Block copolymer having the average composition, $Me_3SiO[Me_2SiO]_{5.1}[MeO(C_2H_4O)_{7.2}C_3H_6Si(Me)O]_{7.5}SiMe_3$.

/5/ Average composition is $[Me_3SiO_{1/2}]_{1.0}[C_6H_5CH_2O(C_2H_4O)_{7.7}C_3H_6Si(Me)O_{2/2}]_{1.0}[SiO_{4/2}]_{0.9}$ /6/ "Ionol" was also present in Blended Surfactants K, M, O and BB (1%), N (10,000 p.p.m.) and AA (2500 p.p.m.).

EXAMPLES 27-30

In accordance with these examples, Blended Surfactants H, K, L and M were used as the surfactant component of Foam Formulation A of Table II above in a concentration of 1 part by weight, following the general procedure described above with reference to Examples 13–18. As controls, runs were also made using Blended Surfactants AA and BB as the surfactant Component of Foam Formulation A, also at a concentration of one part by weight, following the same procedure. In using the blended surfactants, clear, homogeneous aqueous premixtures were obtained when the water and amine catalysts of Foam Formulation A were combined therewith. The results of these examples, as well as of control Runs K-1 and K-2, are given in the following Table VII.

TABLE VII

STABILIZATION OF FLAME-RETARDED FOAM USING BLENDED SURFACTANTS AND FOAM FORMULATION A

| Ex. | Blended Surfactant /1/ | Si-Component Pts. by Wt. | Rise (Inches) | FOAM QUALITY Breathability (SCFM) | CPI | Density (pcf) | Rating | FLAMMABILITY Burning Extent (Inches) | Burning Time (seconds) |
| --- | --- | --- | --- | --- | --- | --- | --- | --- | --- |
| 27 | H | 0.35 | 6 | 3.3 | 45–50 | 2.08 | SE | 1.6 | 32 |
| 28 | L | 0.35 | 5.9 | 2.0 | 40–45 | 2.0 | SE | 2.8 | 56 |
| 29 | K | 0.52 | 5.0 | 1.9 | 45–50 | 2.19 | SE | 1.9 | 39 |
| 30 | M | 0.52 | 5.2 | 5.5 | 45–50 | 1.88 | SE | 3.2 | 65 |
| Controls /1/ | | | | | | | | | |
| K-1 | AA | 0.35 | 6.0 | 2.3 | 35–40 | 1.99 | B | — | 126 |
| K-2 | BB | 0.52 | 5.9 | 2.2 | 45–50 | 1.96 | SE | 2.0 | 50 |

/1/ Composition as given in Table VI; employed in an amount of one part by weight per 100 parts by weight of polyester reactant.

EXAMPLES 31–34

In accordance with these examples (and control Runs K-3 and K-4), a potency determination was made employing Blended Surfactants H, J, L and M (and control Blended Surfactants AA and BB) as the surfactant component of Foam Formulation B (Table IV) employing the respective blended surfactants at a concentration of one part by weight and following the above-described foaming procedure. The results are given in Table VIII which follows.

TABLE VIII

POTENCY STUDY FOAM FORMULATION B

| Ex. | Blended Surfactant /1/ | Rise (inches) | Breathability (SCFM) | Density (pcf) | CPI |
| --- | --- | --- | --- | --- | --- |
| 31 | H /2/ | 8.6 | 1.9 | 1.42 | 10–15 |
| 32 | J /2/ | 8.6 | 2.4 | 1.41 | 10–15 |
| 33 | L /2/ | 8.9 | 2.8 | 1.38 | 15–20 |
| 34 | M /3/ | 8.7 | 3.5 | 1.36 | 10–15 |
| Controls | | | | | |
| K-3 | AA /2/ | 9.0 | 2.3 | 1.35 | 15–20 |
| K-4 | BB /3/ | 8.8 | 1.8 | 1.39 | 35–40 |

/1/ One part by weight.
/2/ 0.35 part by weight of silicon-containing component present.
/3/ 0.52 part by weight of silicon-containing component present.

As shown by the flammability data of Table VII and the results of the potency evaluation of Table VIII, the performance of Blended Surfactants H and J through M of the invention was excellent from both standpoints. In Examples 27 and 28 of Table VII, the blended surfactants contained the cyanopropyl-substituted polymethylsiloxane-polyoxyethylene block copolymers of the invention in a concentration of 0.35 parts which is also the concentration of the unsubstituted polymethylsiloxane-polyoxyethylene block copolymer component of the control employed in Run K-1. Whereas the flame-retarded control foam did not qualify for a self-extinguishing rating (by ASTM D-1692-68), the flame-retarded foams of Examples 27 and 28 did qualify for the self-extinguishing rating and were of low burning extent. This significant improvement is also realized without substantial reduction in potency as shown by the potency evaluation of Examples 31–33 and control Run K-3 of Table VIII. In Examples 29 and 30 and control Run K-2 of Table VII and in Example 34 and control Run K-4 of Table VIII, the silicon-containing components were present in a concentration of 0.52 parts. Inspection of these results show that the flammability properties of the flame-retarded foam products produced with the blended surfactants containing the block copolymers of the invention compare favorably with those of control foam K-2, notwithstanding the fact that the inorganic tetrafunctional $SiO_{4/2}$ units essential to the performance of the silicon-containing component of the control are not essential in the copolymers of this invention to achieve flame-retarded foams of low burning extent.

EXAMPLES 35–39

In accordance with these examples and control Runs K-5 to K-7, a series of machine scale polyester urethane foams were prepared employing mixtures of Blended Surfactants N and O, and control Blended Surfactants AA and BB, as the foam stabilizing components of Foam Formulations C and D which contained 5.0 and 3.6 parts water per 100 parts of polyester polyol, respectively. The purpose of these examples was to determine whether the cyanopropyl-modified copolymers of the invention as illustrated by Surfactant G contained in Blended Surfactants N and O, are capable of providing semi-commercial size foam buns having acceptable physical properties. In these examples and control runs, a Hennecke UBT-63 high pressure continuous polyurethane foam machine was used to which the following three streams were added: (1) the polyester polyol; (2) the activator stream containing water, amine catalysts and foam-stabilizing surfactants; and (3) the polyisocyanate reactant. The mixer speed was about 5000 revolutions per minute and the head pressure was 12–17 pounds per square inch. At ambient temperature the emerging foam mixture was poured onto paper on a continuously moving conveyor belt. The foams were allowed to set and cure in the form of large slabs (12 feet in length, 22 inches wide and 18 inches high). After 24 hours of aging at ambient temperature the foams were cut and submitted for physical property measurements. The composition of Foam Formulations C and D, the amount of the blended surfactants employed in each example and control run, and the results are given in Tables IX and X which follow.

TABLE IX

POLYESTER POLYOL-BASED FOAMS (Machine Runs)

| EXAMPLE NO. | — | — | 35 | 36 | 37 |
|---|---|---|---|---|---|
| Control Run No. | K-5 | K-6 | — | — | — |
| Foam Formulation C, Parts by Weight | | | | | |
| Polyester Polyol /1/ | 100 | 100 | 100 | 100 | 100 |
| Polyisocyanate /1/ (Index = 105) | 59.2 | 59.2 | 59.2 | 59.2 | 59.2 |
| Water | 5.0 | 5.0 | 5.0 | 5.0 | 5.0 |
| Total Blended Surfactant | 1.0 | 1.0 | 1.0 | 1.0 | 1.0 |
| Control AA /2/ | 1.0 | — | — | — | — |
| Control BB /2/ | — | 1.0 | — | — | — |
| N /2/ | — | — | 0.75 | 0.50 | 0.25 |
| O /2/ | — | — | 0.25 | 0.50 | 0.75 |
| N-Ethylmorpholine | 2.0 | 2.0 | 2.0 | 2.0 | 2.0 |
| Hexadecyldimethylamine | 0.3 | 0.3 | 0.3 | 0.3 | 0.3 |
| Cream Time, seconds | 3 | 3 | 3 | 3 | — |
| Rise Time, seconds | 46 | 47 | 45 | 47 | — |
| Gel Time, seconds | 80 | 81 | 80 | 78 | — |
| Foam Properties | | | | | |
| Foam density, lbs./ft.³ | 1.21 | 1.23 | 1.25 | 1.23 | 1.28 |
| Breathability, SCFM | 0.214 | 0.240 | 0.499 | 0.346 | 0.677 |
| ILD (4''), lbs./50 in.² | | | | | |
| 25% | 50.7 | 56.9 | 50.9 | 47.3 | 47.8 |
| 65% | 96.0 | 125 | 85.8 | 78.3 | 82.3 |
| 25% return | 27.0 | 29.1 | 25.9 | 24.4 | 26.1 |
| Compression Sets, % | | | | | |
| 50% | 16.7 | 16.8 | 12.0 | — | — |
| 90% | 65.4 | 74.4 | 19.2 | 16.9 | 14.5 |
| Tensile strength, p.s.i. | 26.9 | 24.8 | 23.8 | 23.6 | 23.3 |
| Elongation, % | 236 | 256 | 256 | 248 | 219 |
| Tear Resistance, lbs./in. | 3.19 | 3.86 | 3.6 | 3.5 | 3.9 |
| CPI | 40–45 | 40–45 | 40–45 | 40–45 | 40–45 |

/1/ As defined in Table II.
/2/ As defined in Table VI.

TABLE X

POLYESTER POLYOL-BASED FOAMS (Machine Runs)

| EXAMPLE NO. | — | 38 | 39 |
|---|---|---|---|
| Control Run No. | K-7 | — | — |
| Foam Formulation D, Parts by Weight | | | |
| Polyester Polyol /1/ | 100 | 100 | 100 |
| Polyisocyanate /1/ (Index = 105) | 45.2 | 45.2 | 45.2 |
| Water | 3.6 | 3.6 | 3.6 |
| Total Blended Surfactant | 1.0 | 2.0 | 1.0 |
| Control AA /2/ | 1.0 | — | — |
| N /2/ | — | 1.0 | 0.5 |
| O /2/ | — | 1.0 | 0.5 |
| 3-Dimethylaminopropionitrile/Bis[2-(N,N-dimethylamino)ethyl]ether (95/5) | 2.0 | 2.0 | 2.0 |
| Hexadecyldimethylamine | 0.3 | 0.3 | 0.3 |
| Cream Time, seconds | 2.5 | 3 | 2.5 |
| Rise Time, seconds | 56 | 57 | 57 |
| Gel Time, seconds | 81 | 80 | 77 |
| Foam Properties | | | |
| Foam density, lbs./ft.³ | 1.61 | 1.65 | 1.67 |
| Breathability, SCFM | 0.678 | 1.54 | 0.77 |
| ILD (4''), lbs./50 in.² | | | |
| 25% | 52.2 | 43.0 | 49.0 |

TABLE X-continued

| POLYESTER POLYOL-BASED FOAMS (Machine Runs) | | | |
|---|---|---|---|
| 65% | 84.5 | 68.5 | 80.0 |
| 25% return | 28.9 | 24.6 | 28.1 |
| Compression Set, 90% | 8.5 | 9.1 | 9.0 |
| Tensile strength, p.s.i. | 22.2 | 24.4 | 23.9 |
| Elongation, % | 308 | 347 | 312 |
| Tear Resistance, lbs./in. | 3.5 | 3.5 | 3.5 |
| CPI | 50–55 | 50–55 | 50–55 |

/1/ As defined in Table II.
/2/ As defined in Table VI.

From the data of Tables IX and X as well as the other data presented herein, it is evident that the cyanopropyl-substitued polymethylsiloxane-polyoxyethylene copolymers of the invention possess a highly desirable combination of properties including potency, ability to provide flexible polyester urethane having good physical properties and further allow for the formation of flameretarded foam of low burning extent without the need to incorporate inorganic silicate ($SiO_{4/2}$) into the polymer network as present in control Blended Surfactant BB. It is noted that in the 5 parts water system employed in the examples of Table IX, reduction of the concentration of control Blended Surfactant AA to only 0.5 part provided a weak, unacceptable foam due to severe splitting. Poor results were also obtained when Blended Surfactants N and O were used in a total concentration of only 0.5 part. However, this result is explainable by the presence in the reaction mixture of less than a foam stabilizing amount of surfactant and not to any inherent deficiency of the surfactant as such as shown by the excellent results obtained in Examples 35–37. A determination of the minimum amount of surfactant required to stabilize any given foam formulation is well within the skill of the art.

What is claimed is:

1. Siloxane-polyoxyalkylene block copolymers having the average composition,

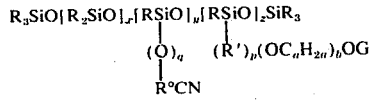

wherein: R is alkyl having from 1 to 10 carbon atoms; R° is bivalent alkylene of from 2 to 12 carbon atoms; R' comprises a bivalent alkylene group of from 2 to 6 carbon atoms a carbon atom of which is bonded to silicon; $a$ has a value from 2 to 4 provided at least 75 weight percent of the polyoxyalkylene content of the copolymers is constituted of oxyethylene; G is R°°—, R°°NHC(O)— or R°°C(O)— where R°° is a monovalent hydrocarbon group of 1 to 12 carbon atoms; $b$ has an average value from about 3 to about 30; $q$ is zero or 1; $p$ is zero or 1; $x$ is zero or a positive number having an average value up to about 20, $y$ has an average value from about 2 to about 20 and $z$ has an average value from about 2 to about 30, provided the average weight of the copolymers attributable to the polyoxyalkylene blocks, —(R')$_p$(OC$_a$H$_{2a}$)$_b$OG, is from about 50 to about 85 weight percent.

2. The copolymers of claim 1 in which R is alkyl having from 1 to 4 carbon atoms.

3. The copolymers of claim 1 in which R is methyl.

4. The copolymers of claim 1 in which R° has from 2 to 6 carbon atoms.

5. The copolymers of claim 1 in which —R°CN is gamma-cyanopropyl.

6. The copolymers of claim 1 in which the polyoxyalkylene content is constituted of at least 85 weight percent oxyethylene.

7. The copolymers of claim 1 in which $x$ is zero.

8. The copolymers of claim 1 in which $x$ is a positive number.

9. The copolymers of claim 1 in which the ratio of $x+y$:$z$ is from about 0.5:1 to about 6:1.

10. Siloxane-polyoxyethylene block copolymers having the average composition,

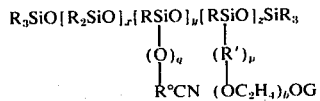

wherein: R is alkyl of 1 to 4 carbon atoms; R° is bivalent alkylene of 2 to 6 carbon atoms; R' comprises a bivalent alkylene group of from 2 to 6 carbon atoms a carbon atom of which is bonded to silicon; G is an organic capping group selected from the group consisting of R°°—, R°°NHC(O)— and R°°C(O)— where R°° is a monovalent hydrocarbon radical having from 1 to 12 carbon atoms; $q$ is zero or 1, $p$ is zero or 1; $b$ has an average value from about 3 to about 30; $x$ is a positive number having an average value up to about 20, $y$ has an average value from about 2 to 20, and $z$ has an average value from about 2 to about 30, provided an average of from about 50 to about 85 weight percent of the copolymers is constituted of said —(R')$_p$(OC$_2$H$_4$)$_b$OG blocks and the average value of the ratio $x+y$:$z$ is from about 0.5:1 to about 4:1.

11. The copolymers of claim 10 in which $q$ is zero and $p$ is 1.

12. The copolymers of claim 10 in which $q$ and $p$ are both zero.

13. The copolymers of claim 10 in which $q$ and $p$ are both 1.

14. The copolymers of claim 10 in which $q$ is 1 and $p$ is zero.

15. The copolymers of claim 10 in which R°° is alkyl having from 1 to 4 carbon atoms.

16. The copolymers of claim 10 in which R°° is aryl.

17. The copolymers of claim 10 in which R°° is aralkyl.

18. The copolymers of claim 10 in which G is said R°°— group.

19. The copolymers of claim 10 in which G is said R°°C(O)— group.

20. The copolymers of claim 10 in which G is said R°°NHC(O)— group.

21. Siloxane-polyoxyalkylene block copolymers having the average composition,

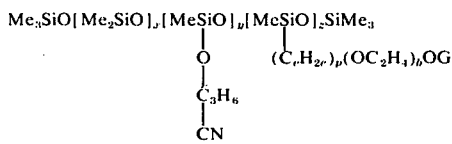

wherein: Me is methyl; G is a monovalent hydrocarbon group having from 1 to 12 carbon atoms; $b$ has an average value from about 4 to about 15; $p$ is zero or 1; $e$ has a value from 2 to 4; $x$ has an average value from about 1 to about 10, $y$ has an average value from about 2 to about 10, and $z$ has an average value from about 2 to about 15, provided the ratio $x+y:z$ is no higher than about 4:1 and said $—(C_eH_{2e})_p(OC_2H_4)_bOG$ blocks constitute on the average from about 50 to about 85 weight percent of the copolymers.

22. The copolymers of claim 21 in which $p$ is 1 and $e$ is 3.

23. As novel compositions, cyanoalkyl-substituted polyalkylsiloxane hydrides having the average composition,

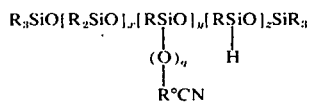

wherein: R is alkyl having from 1 to 10 carbon atoms; $R°$ is bivalent alkylene having from 2 to 12 carbon atoms; $q$ is zero or 1; $x$ is zero or a positive number having an average value less than about 10; $y$ has an average value from about 2 to about 20; and $z$ has an average value from about 2 to about 30.

24. Compositions as defined in claim 23 in which $q$ is zero and $R°CN$ is gamma-cyanopropyl.

25. Compositions polymers as defined in claim 23 in which $q$ is 1 and $R°CN$ is gamma-cyanopropyl.

26. Siloxane-polyoxyalkylene copolymers having the average composition,

wherein: R is alkyl having from 1 to 4 carbon atoms; $R°$ is bivalent alkylene having from 2 to 6 carbon atoms; $R^\infty$ is a monovalent hydrocarbon group having from 1 to 12 carbon atoms; $e$ has a value from 2 to 6; $b$ has an average value from about 3 to about 30; $a$ has a value from 2 to 4 provided an average of at least 75 weight percent of $—(OC_aH_{2a})_b—$ is constituted of oxyethylene; and $x$ is zero or a positive number having an average value up to about 20, $y$ has an average value from about 2 to about 20 and $z$ has an average value from about 2 to about 30, provided an average of from about 50 to about 85 weight percent of the copolymers is constituted of $—C_eH_{2e}(OC_aH_{2a})_bOR^{\infty}$.

27. A copolymer as defined in claim 26 wherein: R is methyl; $R°CN$ is gamma-cyanopropyl; $e$ has a value of no more than 4; and $R^\infty$ is alkyl having from 1 to 4 carbon atoms.

28. A copolymer as defined in claim 26 in which $x$ is zero.

29. A copolymer as defined in claim 27 in which $x$ is a positive number.

30. As novel compositions, cyanopropyl-substituted polymethylsiloxane hydrides having the average composition,

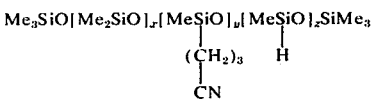

wherein: $x$ has an average value from about 0.1 to about 9.5; $y$ has an average value from about 2 to about 20; and $z$ has an average value from about 2 to about 30.

31. Compositions polymers as defined in claim 30 in which $x$ has an average value from about 0.1 to about 8; $y$ has an average value from about 2 to about 10; and $z$ has an average value from about 2 to about 15.

32. Siloxane-polyoxyethylene block copolymers having the average composition,

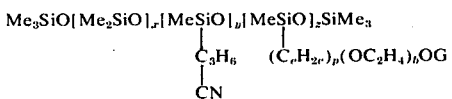

wherein: Me is methyl; G is a monovalent hydrocarbon group having from 1 to 12 carbon atoms; $b$ has an average value from about 4 to about 15; $p$ is zero or 1; $e$ has a value from 2 to 4; $x$ has an average value from about 1 to about 10; $y$ has an average value from about 2 to about 10, and $z$ has an average value from about 2 to about 15, provided the ratio $x+y:z$ is no higher than about 4:1 and said $—(CeH_{2e})_p(OC_2H_4)_bOG$ blocks constitute on the average from about 50 to about 85 weight percent of the copolymers.

33. The copolymers of claim 32 in which $p$ is 1 and $e$ is 3.

34. The copolymers of claim 32 in which G is methyl.
35. The copolymers of claim 32 in which G is phenyl.
36. The copolymers of claim 32 in which G is benzyl.

* * * * *

UNITED STATES PATENT OFFICE
CERTIFICATE OF CORRECTION

Patent No. 3,954,824                    Dated May 4, 1976

Inventor(s) Bela Prokai and Bernard Kanner

It is certified that error appears in the above-identified patent and that said Letters Patent are hereby corrected as shown below:

Column 2, line 22, for "surfact" read -- surface --.
Column 6, line 26, after "methyl," read -- ethyl, --. Column 8, line 45, for "whereine" read -- wherein e --. Column 9, line 9, for "lene" read -- alkylene --. Column 11, lines 54-55, that portion of the formula reading $$[RSiO]_z \quad \text{should read} \quad \begin{matrix}[RSiO]_z\\|\end{matrix}$$
$$(OC_aH_{2a})_bOG \qquad\qquad (OC_aH_{2a})_bOG$$

Column 12, line 17, for "be" read -- by --. Column 13, line 12, for "produce" read -- product --. Column 15, Equation 7a, in the second line thereof, for the subscripts "x" and "y", read -- x' -- and -- y' --, respectively, and immediately after each of said subscripts, delete the extraneous vertical line. Column 16, Equation 8a, in the second line thereof, for the subscripts "x" and "y", read -- x' -- and -- y' --, respectively, and immediately after each of said subscripts, delete the extraneous vertical line; Equation 8b, in the first and second lines thereof, in each occurrence, the subscripts "x" and "y", should read -- x' -- and -- y' --, respectively, and immediately after said subscripts in the first line of Equation 8b, delete the extraneous vertical line; Equation 8c, in the first line thereof, for the subscripts "x" and "y", read -- x' -- and -- y' --, respectively, and immediately after said subscripts, delete the extraneous vertical lines. Column 22, line 64, for "are" 2nd occ. read -- and --. Col.26, line 65, for "inclue" read -- include --. Column 27, line 26, for "use" read -- used --; lines 61-66, that portion of the formula reading

UNITED STATES PATENT OFFICE
CERTIFICATE OF CORRECTION

Patent No. 3,954,824  Dated May 4, 1976

Inventor(s) Bela Prokai and Bernard Kanner

It is certified that error appears in the above-identified patent and that said Letters Patent are hereby corrected as shown below:

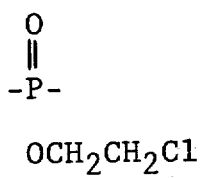   should read   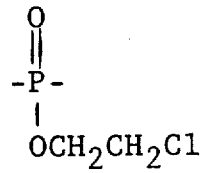

Column 29, line 52, for "dimethylsloxane" read -- dimethylsiloxane --. Column 48, line 28, after "Compositions", delete "polymers"; line 47, that portion of the formula reading $-(C_eH_{2e})_p$   should read   $-(C_eH_{2e})_p$ Signed and Sealed this second Day of August 1977

[SEAL]

Attest:

RUTH C. MASON
Attesting Officer

C. MARSHALL DANN
Commissioner of Patents and Trademarks